(12) United States Patent
Nakagawa et al.

(10) Patent No.: US 7,521,725 B2
(45) Date of Patent: Apr. 21, 2009

(54) OPTICAL WAVEGUIDE AND THE METHOD OF FABRICATING THE SAME

(75) Inventors: Youhei Nakagawa, Hirakata (JP); Nobuhiko Hayashi, Osaka (JP); Keiichi Kuramoto, Kadoma (JP); Mitsuaki Matsumoto, Hirakata (JP); Hitoshi Hirano, Nishinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 145 days.

(21) Appl. No.: 11/059,648

(22) Filed: Feb. 17, 2005

(65) Prior Publication Data

US 2005/0205885 A1 Sep. 22, 2005

(30) Foreign Application Priority Data

Mar. 17, 2004 (JP) ............................. 2004-076053

(51) Int. Cl.
*H01L 33/00* (2006.01)
(52) U.S. Cl. .......................... 257/98; 257/79
(58) Field of Classification Search ............... 257/79, 257/98
See application file for complete search history.

(56) References Cited

U.S. PATENT DOCUMENTS

| 5,943,465 | A | 8/1999 | Kawaguchi et al. |
| 5,969,821 | A | 10/1999 | Muramatsu et al. |
| 6,243,516 | B1 | 6/2001 | Seino |
| 6,500,603 | B1* | 12/2002 | Shioda .................. 430/321 |
| 2004/0191539 | A1* | 9/2004 | Kuramoto et al. ............ 428/454 |
| 2007/0190296 | A1* | 8/2007 | Yoshikawa et al. ....... 428/195.1 |

FOREIGN PATENT DOCUMENTS

| JP | 08-094869 | | 4/1996 |
| JP | 08-184701 | | 7/1996 |
| JP | 9-257814 | | 10/1997 |
| JP | 9-288035 | | 11/1997 |
| JP | 10-3100 | | 1/1998 |
| JP | 11-038252 | A | 2/1999 |
| JP | 11-237517 | | 8/1999 |
| JP | 2000-266949 | A | 9/2000 |
| JP | 2001-133647 | A | 5/2001 |
| JP | 2001-296438 | A | 10/2001 |
| JP | 2002-139638 | A | 5/2002 |
| JP | 2003-121677 | A | 4/2003 |
| JP | 2003-215792 | A | 7/2003 |
| JP | 2004-062141 | A | 2/2004 |
| JP | 2001296438 | * | 10/2006 |

OTHER PUBLICATIONS

Miyadera, Nobuo, "Polymeric materials for an optical waveguide." Optical Alliance, 1999, No. 2, pp. 13-19.
Japanese Office Action issued in Japanese Patent Application No. 2004-076053, dated on Jun. 6, 2007.

* cited by examiner

*Primary Examiner*—Long Pham
(74) *Attorney, Agent, or Firm*—McDermott Will & Emery LLP

(57) ABSTRACT

Disclosed herein is an optical waveguide comprising a core layer to be an optical waveguide region, an upper clad layer covering the core layer and a lower clad layer, characterized in that an ultraviolet control region for preventing ultraviolet light from entering is provided at any one location of under the lower clad layer, on an interface of the lower clad layer and the upper clad layer, and on the upper clad layer. And a method of fabricating this optical waveguide is also disclosed.

8 Claims, 15 Drawing Sheets (d)

(e)

OPTICAL WAVEGUIDE AND THE METHOD OF FABRICATING THE SAME

The priority Japanese Patent Application Number 2004-76053 upon which this patent application is based is hereby incorporated by reference.

BACKGROUND OF THE INVENTION

1. Field of the Invention

The present invention relates to an optical waveguide and a method of fabrication thereof.

2. Description of the Related Art

In recent years, under circumstances where the trend of Internet toward broadband moves forward, it is necessary to reduce a large amount of the cost of devices for optical communication for wide spread use of access such as FTTH. Optical transmitter and receiver modules to convert light to electrical signals are used in terminals of equipment for optical communication as a device for optical communication. In order to bring this optical transmitter and receiver module down in size and cost, there is proposed a method in which an optical waveguide, being a part within the module, is formed from an organic polymeric material (Nobuo Miyadera, "Polymeric materials for an optical waveguide", Optical Alliance, 1999, no. 2, p. 13).

For example, a lower clad layer is formed on a substrate, and on this clad layer, an optical waveguide layer consisting of an organic polymeric material is formed. In this optical waveguide layer, a pattern is formed and an unnecessary portion is eliminated by reactive ion etching (RIE) and ultraviolet (UV) irradiation using photolithography. On the optical waveguide layer thus formed, an upper clad layer is formed. In many case, the lower clad layer and the upper clad layer are also formed from an organic polymeric material.

When a core layer to be an optical waveguide layer, and a lower clad layer and an upper clad layer are formed from photo-curable (ultra violet curable) resin, it is necessary to control the amount of ultraviolet light irradiated with high accuracy since the refractive indexes of the respective layers vary depending on the amount of ultraviolet light irradiated. However, the present inventors have found a problem that when curing the clad layer or the core layer by irradiating ultraviolet light, the clad layer or the core layer was affectedly a thickness of a substrate and the like and the refractive index of the cure clad layer or core layer varied after curing.

For example, when irradiating the ultraviolet light to the upper clad layer to cure it, part of the ultraviolet light irradiated to the upper clad layer passes through the lower clad layer, penetrates into the substrate, is reflected by the underside of the substrate, passes through the lower clad layer again and reaches the upper clad layer. Since the ultraviolet light reflected within the substrate thus reaches the upper clad layer, curing of the upper clad layer is also advanced by this reflected ultraviolet light. Therefore, an amount of the ultraviolet light reflected at the substrate and reaching the upper clad layer varies due to the substrates having different thicknesses and thereby an amount of the ultraviolet light irradiated to the upper clad layer. As a result of this, a state of the cured upper clad layer varies and unevenness of its refractive index results. Thus, there arises a problem that the clad layer or the core layer is affected by variations in thickness of the substrate and the like and unevenness of the refractive index of the clad layer or the core layer results and therefore it is impossible to set the refractive index of each layer at a predetermined level as designed.

SUMMARY OF THE INVENTION

It is an object of the present invention to provide an optical waveguide and a method of fabricating the optical waveguide, which can form a clad layer and/or a core layer in such a way that the refractive index of the layer is uniform without being affected by a thickness of a substrate and the like.

An optical waveguide of the present invention is an optical waveguide comprising a core layer to be an optical waveguide region, an upper clad layer covering the core layer and a lower clad layer, and is characterized in that an ultraviolet control region for preventing ultraviolet light from entering is provided at any one or more locations of under the lower clad layer, on an interface of the lower clad layer and the upper clad layer and on the upper clad layer.

By proving the ultraviolet control region according to the present invention, it is possible to inhibit the ultraviolet light from entering a layer below the ultraviolet control region when the ultraviolet light is irradiated in order to cure resin. Therefore, it is possible to inhibit the ultraviolet light from entering a substrate existing below the ultraviolet control region, for example, by proving the ultraviolet control region on the underside of the lower clad layer. Thus, it is possible to reduce an effect of curing due to the ultraviolet light reflected at the underside of the substrate, which has been a problem. Accordingly, it is possible to inhibit the ultraviolet light reflected at the underside of the substrate from entering the lower clad layer in curing the lower clad layer by irradiating the ultraviolet light and the lower clad layer can be cured in such a way that its refractive index is uniform without being affected by the thickness of the substrate and the like. Further, since an amount of the ultraviolet light passing through the lower clad layer and reflected at the underside of the substrate can be suppressed also in curing the upper clad layer or the core layer, the upper clad layer or the core layer can be cured in such a way that the refractive indexes of these layer are uniform without being affected by the thickness of the substrate and the like.

In the case where the ultraviolet control region is provided on an interface of the lower clad layer and the upper clad layer, since an amount of the ultraviolet light passing through the lower clad layer and reflected at the underside of the substrate can be suppressed in curing the upper clad layer by irradiating the ultraviolet light, the upper clad layer can be cured in such a way that the refractive index of the upper clad layer is uniform.

When using an upper substrate, the upper clad layer, the core layer and the lower clad layer are formed one by one on the upper substrate, by proving the ultraviolet control region on the upper clad layer, an amount of the ultraviolet light reflected at the topside of the upper substrate can be suppressed in curing the upper clad layer by irradiating the ultraviolet light to it, and therefore the upper clad layer can be cured in such a way that its refractive index is uniform. Similarly, when forming the lower clad layer, the lower clad layer can be formed in such a way that the refractive index of the lower clad layer is uniform since an amount of the ultraviolet light passing through the upper clad layer and reflected at the topside of the upper substrate can be suppressed. Also, when forming the core layer, the core layer can be similarly formed in such a way that its refractive index is uniform. Further, when it is difficult to form the ultraviolet control region on a base, a part of the upper clad layer, the core layer and the lower clad layer may be cured with heat to the extent that temperature does not thermally damaging a layer to be a substrate or a base to form an ultraviolet control region. Specifically, a part of the upper clad layer, the core layer and the lower clad layer can be cured by heating when temperature is below a glass transition point of the layer to be a substrate or a base.

In the present invention, recesses and projections are preferably formed on the face of at least one side of the ultraviolet control region. By forming such the recesses and projections, it is possible to scatter the ultraviolet light more efficiently on the surface of the ultraviolet control region and inhibit the ultraviolet light from entering. By forming such the recesses and projections, it is possible to scatter the ultraviolet light efficiently even when a difference between two refractive indexes at an interface of the ultraviolet control region and another layer is 0.01 or less. Preferably, the recesses and projections have the surface roughness Rz per a length of 250 µm (JIS B0601) of 50 nm or larger, more preferably 100 nm or larger, and furthermore preferably 400 nm or larger.

Further, in the present invention, at least any one of a component for light absorption and a component for light scattering may be contained in the ultraviolet control region. As the component for light absorption, include, for example, carbon particles. And, as the component for light scattering, include particles, having a refractive index which is different from that of the ultraviolet control region, such as glass particles. By containing the component for light absorption or the component for light scattering, it is possible to absorb or scatter ultraviolet light and to further inhibit the ultraviolet light from entering.

In the present invention, the ultraviolet control region may be formed by stacking two or more layers of thin films having different refractive indexes. By stacking two or more layers of thin films having different refractive indexes, the ultraviolet light can be reflected or scattered on an interface of two layers. The difference between the refractive indexes of the films is preferably 0.002 or more. In addition, it is preferred that a layer located on the side of ultraviolet incidence has a lower refractive index.

Further, in the present invention, the ultraviolet control region may be formed from a thin film which is different from a layer adjacent to the ultraviolet control region in a refractive index. By forming the ultraviolet control region from a thin film having a different refractive index like this, the ultraviolet light can be reflected or scattered on an interface of an upper layer and the ultraviolet control region. In this case, the refractive indexes of the ultraviolet control region is preferably at least 0.002 higher than that of the upper layer.

Further, in the present invention, the ultraviolet control region may be formed from a metal thin film. By forming the ultraviolet control region from a metal thin film, the ultraviolet light can be almost totally reflected. As such a metal, there are given, for example, Ag, Al, Au, Cd, Cu, Ni, Pt, Rh and Sn.

In the present invention, a thickness of the ultraviolet control region is preferably within a range of 100 nm to 2 µm, more preferably within a range of 500 nm to 2 µm. When the thickness of the ultraviolet control region is too thin, since its effects are reduced, it is difficult to retain the consistent amount of ultraviolet light irradiated. And, when the thickness is too thick, it is difficult to form a uniform film thickness and therefore it becomes difficult to retain the consistent amount of ultraviolet light irradiated due to the distribution of the film thickness.

In the present invention, at least one layer of the core layer, the upper clad layer and the lower clad layer is preferably formed from an organic-inorganic composite material. An optical waveguide can be readily fabricated by forming these layers from an organic-inorganic composite material.

In the present invention, the organic-inorganic composite material can be formed, for example, from an organic polymer and metal alkoxide. And, the organic-inorganic composite material may be formed from at least one kind of metal alkoxide. In this case, it is preferably formed from at least two kinds of metal alkoxides.

In the above-mentioned organic-inorganic composite material, a refractive index of an organic-inorganic composite material finally formed can be adjusted by appropriately adjusting the combination of the organic polymer and the metal alkoxide or the combination of at least two kinds of metal alkoxides.

As the metal alkoxide, metal alkoxide having a polymerizable group which is polymerized by light (ultraviolet light) or heat may be employed. In this case, it is preferred to use the metal alkoxide having a polymerizable group which is polymerized by light or heat and metal alkoxide not having the polymerizable group in combination. As the above-mentioned polymerizable group, there are given a methacryloxy group, an acryloxy group, a vinyl group, a styryl group, and the like. When the clad layer or the core layer to be cured by ultraviolet irradiation is formed from an organic-inorganic composite material containing metal alkoxide, it is preferred to contain metal alkoxide having a polymerizable group to be polymerized by light (ultraviolet light) as metal alkoxide.

When the metal alkoxide having a polymerizable group is used, it is preferred that a polymerizable group of metal alkoxide has been polymerized by light or heat.

As the metal alkoxide, there are given alkoxides of Si, Ti, Zr, Al, Sn, Zn, Nb and the like. Particularly, alkoxide of Si, Ti, or Zr is preferably used. Accordingly, alkoxysilane, titanium alkoxide and zirconium alkoxide are preferably used, and particularly, alkoxysilane is preferably used.

The alkoxysilane includes tetraethoxysilane, tetramethoxysilane, tetra-n-propoxysilane, tetraisopropoxysilane, tetra-n-butoxysilane, tetraisobutoxysilane, phenyltriethoxysilane (PhTES), phenyltrimethoxysilane (PhTMS), diphenyldimethoxysilane (DPHDMS) and the like.

Alkoxysilanes having the above-mentioned polymerizable group include 3-methacryloxypropyltriethoxysilane (MPTES), 3-methacryloxypropyltrimethoxysilane (MPTMS), 3-methacryloxypropylmethyldimethoxysilane, 3-acryloxypropyltrimethoxysilane, p-styryltriethoxysilane, p-styryltrimethoxysilane, vinyltrimethoxysilane, and vinyltriethoxysilane.

The titanium alkoxide includes titanium isopropoxide, titaniumbutoxide and the like. As the zirconium alkoxide, there are given zirconium isopropoxide, zirconium butoxide and the like. As the niobium alkoxide, there are given Niobium(V) ethoxide and the like.

Though the above-mentioned substances can be used as the metal alkoxide, it is generally possible to use the metal alkoxides expressed by formulas, $M(OR)_n$, $R'M(OR)_{n-1}$ and $R'_2M(OR)_{n-2}$, wherein M represents metal, n is 2, 3, 4 or 5, and R and R' represent an organic group. As the organic group, there are given an alkyl group, an aryl group and organic groups having the above polymerizable groups. The metal M includes Si, Ti, Zr, Al, Sn, Zn and the like as described above. Further, as the alkyl group, an alkyl group having 1 to 5 carbon atoms is preferred.

In the case where the organic-inorganic composite material is formed from the organic polymer and the metal alkoxide, the organic polymer is not particularly limited as long as it can form the organic-inorganic composite material together with the metal alkoxide. The organic polymer includes, for example, a high polymer having a carbonyl group, a high polymer having a benzene ring and a high polymer having a naphthalene ring.

The specific example of the organic polymer includes, for example, polyvinyl pyrrolidone, polycarbonate, polymethyl methacrylate, polyamide, polyimide, polystyrene, polyethylene, polypropylene, epoxy resin, phenolic resin, acrylic resin, urea resin, melamine resin and the like. Polyvinyl pyrrolidone, polycarbonate, polymethyl methacrylate, polystyrene, epoxy resin and the mixture thereof are preferably used from the viewpoint of forming an organic-inorganic composite material having high optical transparency.

When the organic-inorganic composite material is cured by light (ultraviolet) irradiation, it is preferred that the organic-inorganic composite material contains a photopolymerization initiator. By containing the photopolymerization initiator, it can be cured with a slight amount of light (ultraviolet) irradiation.

As a specific example of the photopolymerization initiator, there are given, for example, benzilketal, α-hydroxyacetophenone, α-aminoacetophenone, acylphosphine oxide, 1-hydroxy-cyclohexyl-phenyl ketone, 2-benzil-2-dimethylamino-1-(4-morpholinophenyl)-butanone-1, trichloromethyltriazin, diphenyliodonium salt, triphenylsulfonium salt and imide sulfonate.

The core layer, the upper clad layer and the lower clad layer in the present invention may be formed from an ultra violet (UV) curable resin. As such UV curable resin, include, for example, epoxy UV curable resins based on an epoxy resin, acrylic UV curable resins, epoxy acrylate UV curable resins, polyurethane UV curable resins and the like.

An optical waveguide of the present invention is preferably formed on a substrate.

A first aspect of the method of production of the present invention pertains to a production method of forming an optical waveguide comprising a core layer to be an optical waveguide region, an upper clad layer covering the core layer and a lower clad layer, in which an ultraviolet control region for preventing ultraviolet light from entering is provided under the lower clad layer, on a substrate, and this method is characterized by comprising a step of forming a layer having fluidity, which consists of material for forming the ultraviolet control region on the substrate, a step of irradiating ultraviolet light to the layer having fluidity with the surface of recesses and projections of a mold having recesses and projections being pressed against the surface of the layer having fluidity and curing the layer having fluidity to form a ultraviolet control region having recesses and projections on its surface, a step of removing the mold on the ultraviolet control region and then forming a clad material layer having fluidity on the ultraviolet control region, a step of irradiating ultraviolet light to the clad material layer with a mold having a projection portion corresponding to a core pattern being pressed against the clad material layer and curing the clad material layer to form a lower clad layer having a groove of a core pattern corresponding to the projection portion, a step of forming a core layer in the groove in the lower clad layer, and a step of applying a clad material onto the core layer and the lower clad layer and curing the clad material by ultraviolet irradiation to form an upper clad layer.

A second aspect of the method of production of the present invention pertains to a production method of forming an optical waveguide comprising a core layer to be an optical waveguide region, an upper clad layer covering the core layer and a lower clad layer, in which an ultraviolet control region for preventing ultraviolet light from entering is provided on an interface of the lower clad layer and the upper clad layer, on a substrate, and this method is characterized by comprising a step of forming a clad material layer having fluidity on the substrate, a step of irradiating ultraviolet light to the clad material layer with a mold having a projection portion corresponding to a core pattern being pressed against the clad material layer and curing the clad material layer to form a lower clad layer having a groove of a core pattern corresponding to the projection portion, a step of applying a core material onto the lower clad layer and to the inside of a groove in the lower clad layer to form a core material layer having fluidity, a step of irradiating ultraviolet light to the core material layer with the surface of recesses and projections of a mold having recesses and projections being pressed against the surface of the core material layer and curing the core material layer to form a core layer in the groove in the lower clad layer and simultaneously to form an ultraviolet control region having recesses and projections on its surface and consisting of a core material on the lower clad layer, and a step of applying a clad material onto the ultraviolet control region and curing the clad material by ultraviolet irradiation to form an upper clad layer.

A third aspect of the method of production of the present invention pertains to a production method of forming an optical waveguide comprising a core layer to be an optical waveguide region, an upper clad layer covering the core layer and a lower clad layer, in which an ultraviolet control region for preventing ultraviolet light from entering is provided on the upper clad layer, in the order of the upper clad layer, the core layer and the lower clad layer on an upper substrate, and this method is characterized by comprising a step of forming a layer having fluidity, which consists of material for forming the ultraviolet control region on the upper substrate, a step of irradiating ultraviolet light to the layer having fluidity with the surface of recesses and projections of a mold having recesses and projections being pressed against the surface of the layer having fluidity and curing the layer having fluidity to form a ultraviolet control region having recesses and projections on its surface, a step of removing the mold on the ultraviolet control region and then applying a clad material layer onto the ultraviolet control region and curing the clad material layer by ultraviolet irradiation to form an upper clad layer, a step of forming a core layer in a predetermined pattern on the upper clad layer, and a step of applying a clad material onto the core layer and the upper clad layer and curing the clad material by ultraviolet irradiation to form an lower clad layer.

A first aspect of an device for optical communication of the present invention is characterized in that the above-mentioned optical waveguide of the present invention or an optical waveguide fabricated by the above-mentioned method of the present invention is used as a medium for sending and/or receiving optical signals.

A second aspect of an device for optical communication of the present invention is characterized in that the above-mentioned optical waveguide of the present invention or an optical waveguide fabricated by the above-mentioned method of the present invention is used as a medium for branching or coupling optical signals.

In accordance with the present invention, the clad layer and/or the core layer can be formed in such a way that the refractive index of the layer is uniform without being affected by the thickness of the substrate and the like. Therefore, when the optical waveguide of the present invention is applied for devices for optical communication, variations in insertion loss can be reduced.

The optical waveguide of the present invention can be used in optical communication devices such as an optical transmitter and receiver module, a photonic switch and an optical modulator; optical devices such as optical waveguide line structures like an optical fiber and a lens array, and a beam splitter including them; optical elements related to display devices (a display, a liquid crystal projector or etc.) such as an integrator lens, a microlens array, a reflecting plate, a light guide plate and a screen for projection; and others such as an eyeglasses, an optical system for CCD, an optical lens, an optical filter, a diffraction grating, an interferometer, an optical coupler, an optical coupler/branching filter, an optical sensor, a holographic optical element, another optical parts, a contact lens and a light emitting diode.

BEST MODES FOR CARRYING OUT THE INVENTION

Hereinafter, the present invention will be described by way of examples, but the present invention is not limited to the following examples and can be embodied by appropriately modifying within the scope of the claims without changing the gist.

Figure 1:
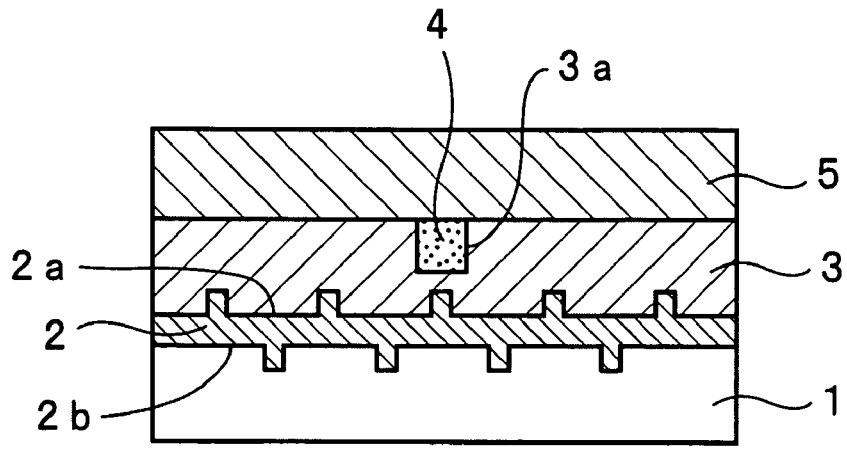
FIG. 1 is a sectional view showing an optical waveguide of an embodiment according to the present invention.

FIG. 1 is a sectional view showing an optical waveguide of an embodiment according to the present invention. As shown in FIG. 1, an ultraviolet control region 2 is provided on a substrate 1. A lower clad layer 3 is provided on the ultraviolet control region 2. A groove 3a is formed at the central portion of the lower clad layer 3, and a core layer 4 to be an optical waveguide region is formed in the groove 3a. An upper clad layer 5 is provided on the core layer 4 and the lower clad layer 3. The lower clad layer 3 and the upper clad layer 5 are formed from material having a lower refractive index than that of the core layer 4. The core layer 4 can transmit light through its inside by being shrouded in the upper clad layer 5 and the lower clad layer 3.

Figure 6:
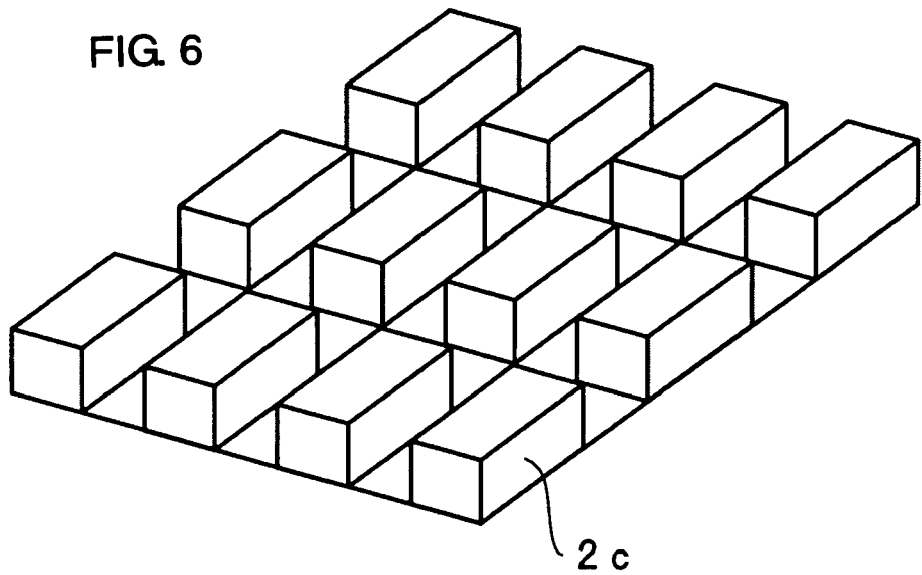
FIG. 6 is a perspective view showing an example of recesses and projections to be formed in an ultraviolet control region.

Recesses and projections 2b are formed on an interface of the ultraviolet control region 2 and the substrate 1. Recesses and projections 2a are formed on an interface of the ultraviolet control region 2 and the lower clad layer 3. Recesses and projections 2a and recesses and projections 2b are recesses and projections having a projection portion 2c shown in FIG. 6. That is, they have the configuration of recesses and projections in which the projection portions 2c are located in matrix form in the direction of length and width. The ultraviolet control region 2 is formed from material having a higher refractive index than that of the lower clad layer 3. Accordingly, ultraviolet light entering from the side of the lower clad layer 3 can be reflected at its interface with the lower clad layer 3. And, since recesses and projections 2a are formed on the interface, the ultraviolet light can be dispersed by these recesses and projections 2a. Therefore, it is possible to inhibit ultraviolet light from entering the substrate 1. Further, since recesses and projections 2b are also formed on the interface of the ultraviolet control region 2 and the substrate 1, it is possible to scatter the ultraviolet light and to further inhibit ultraviolet light from entering the substrate 1 also by these recesses and projections 2b.

As described above, in this embodiment, since the ultraviolet control region 2 is provided between the substrate 1 and the lower clad layer 3, it is possible to inhibit ultraviolet light from entering the substrate 1 by this ultraviolet control region 2. Therefore, when the ultraviolet light is irradiated to the lower clad layer 3 to cure the lower clad layer 3, it is possible to inhibit the ultraviolet light from entering the substrate 1. Accordingly, in accordance with a structure of the optical waveguide of this embodiment, an effect of the ultraviolet light reflected from the substrate can be reduced when the lower clad layer 3 is cured. Thus, the lower clad layer 3 can be cured and the refractive index of the lower clad layer 3 can be uniform without being affected by the thickness of the substrate 1 and the like.

Similarly, when the core layer 4 and the upper clad layer 5 are cured and formed by irradiating ultraviolet light, an effect of the ultraviolet light reflected at the substrate 1 can be reduced and their refractive indexes can be uniform without being affected by the thickness of the substrate 1 and the like.

Figure 8:
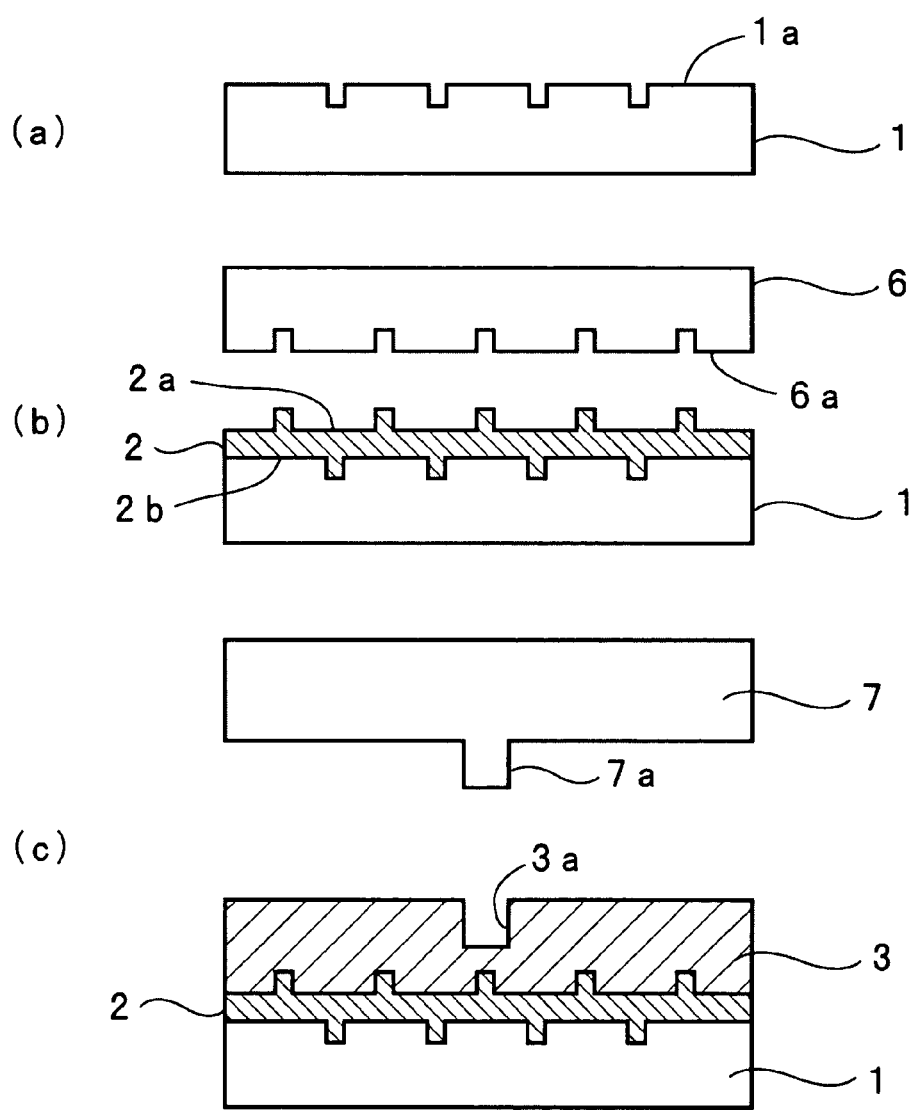
FIG. 8 is a sectional view showing fabrication steps of the embodiment shown in FIG. 1.
Figure 9:
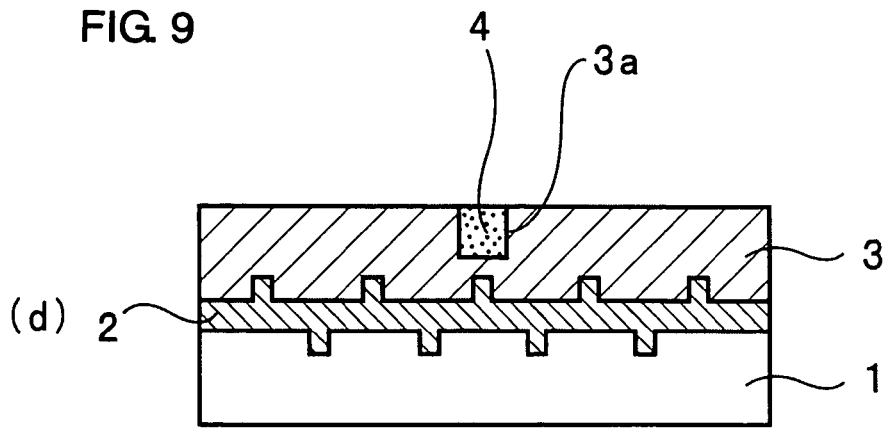
FIG. 9 is a sectional view showing fabrication steps of the embodiment shown in FIG. 1.
Figure 9:
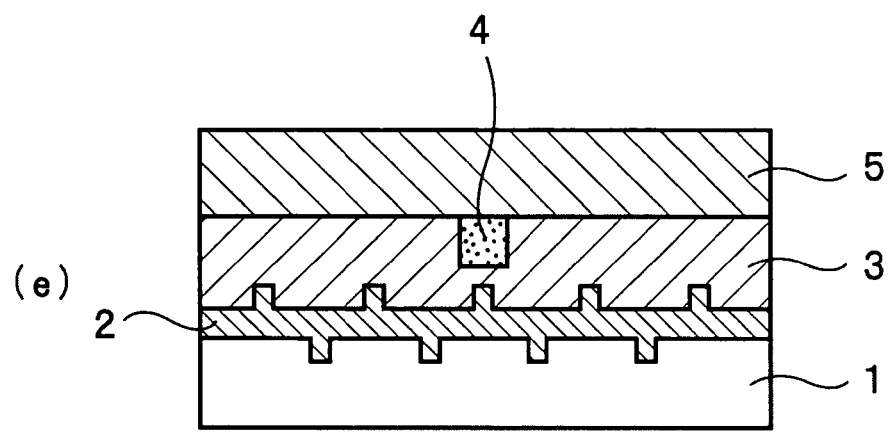

FIGS. 8 and 9 are a sectional view showing process steps of fabricating the optical waveguide of the embodiment shown in FIG. 1.

As shown in FIG. 8(a), recesses and projections 1a corresponding to recesses and projections 2b of the ultraviolet control region 2 is formed on the glass substrate 1. Next, as shown in FIG. 8(b), a mold 6 having recesses and projections 6a corresponding to recesses and projections 2a of the ultraviolet control region 2 is prepared, and after liquid, being a precursor of an organic-inorganic composite material, is added dropwise onto the glass substrate 1, the surface of recesses and projections 6a of the mold 6 is pressed against the liquid, and in this state, the liquid is irradiated with ultraviolet light and cured to form a ultraviolet control region 2. Recesses and projections 2b are formed on an interface of the ultraviolet control region 2 with the substrate 1 and recesses and projections 2a are formed on the surface of the ultraviolet control region 2. In addition, the mold 6 used in this embodiment is formed from Si.

Next, as shown in FIG. 8(c), after a clad material solution being a precursor of an organic-inorganic composite material is added dropwise onto the ultraviolet control region 2, a mold 7 is pressed against this solution, and in this state, the solution is irradiated with ultraviolet light and cured to form a lower clad layer 3. A projection portion 7a corresponding to a pattern of a core layer is formed on the mold 7 and a groove 3a corresponding to this projection portion 7a is formed in the lower clad layer 3. In addition, the mold 7 in this embodiment is formed from silicon rubber.

Next, as shown in FIG. 9(d), a solution of a core material is poured into the groove 3a in the lower clad layer 3 and cured by irradiating ultraviolet light to form a core layer 4. Next, as shown in FIG. 9(e), a clad material solution is applied onto the core layer 4 and the lower clad layer 3 and cured by irradiating ultraviolet light to form an upper clad layer 5.

Figure 10:
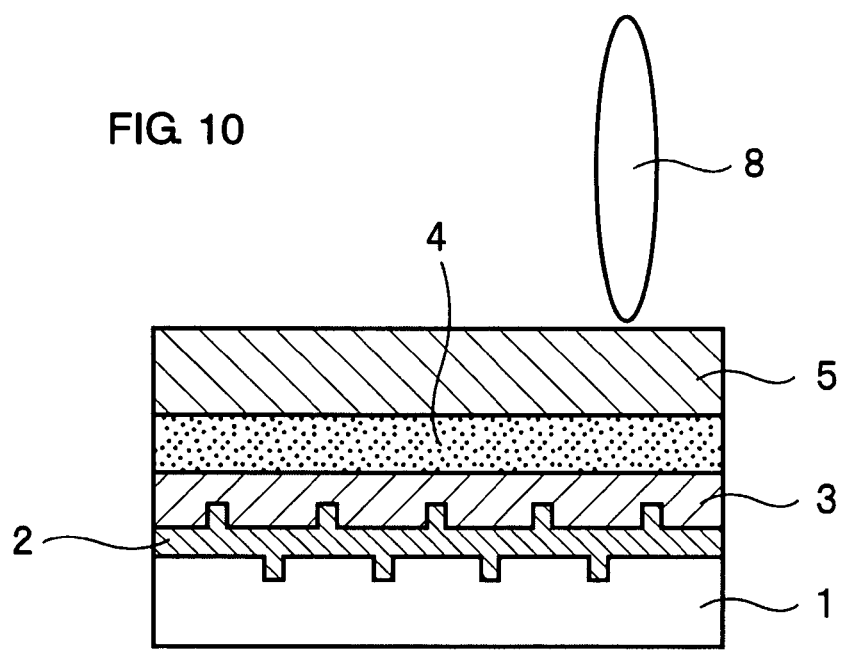
FIG. 10 is a sectional side elevation view showing a state of cutting an end portion of the optical waveguide of the embodiment shown in FIG. 1 with a dicing saw.

FIG. 10 is a sectional side elevation view showing a state of cutting an end portion of the optical waveguide thus fabricated. As shown in FIG. 10, a good end face can be exposed by cutting the end portion of the optical waveguide with a dicing saw 8.

As described above, in this embodiment, since the ultraviolet control region 2 is provided between the substrate 1 and the lower clad layer 3, it is possible to inhibit ultraviolet light from entering the substrate 1 by the ultraviolet control region 2. Therefore, when the lower clad layer 3, the core layer 4 and the upper clad layer 5 are cured by irradiating ultraviolet light, an effect of the ultraviolet light reflected at the substrate 1 can be reduced. Thus, the respective layers can be formed with their refractive indexes being uniform without being affected by the thickness of the substrate 1 and the like.

Figure 2:
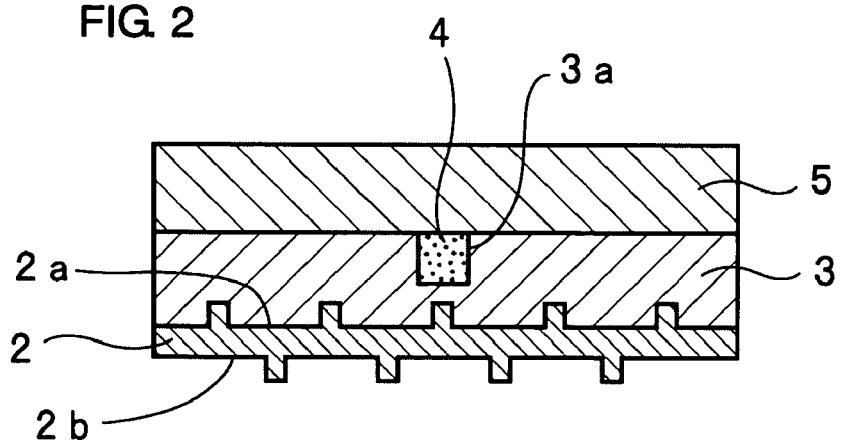
FIG. 2 is a sectional view showing an optical waveguide of another embodiment according to the present invention.

FIG. 2 is a sectional view showing an optical waveguide of another embodiment according to the present invention. In the embodiment shown in FIG. 2, the substrate 1 is not provided under the ultraviolet control region 2. An optical waveguide having such a structure can be fabricated, for example, by forming the ultraviolet control region 2, the lower clad layer 3, the core layer 4 and the upper clad layer 5 in the embodiment shown in FIG. 1 and then removing the substrate 1 from the ultraviolet control region 2. Also in such an embodiment, the lower clad layer 3, the core layer 4 and the upper clad layer 5 can be formed in such a way that their refractive indexes are uniform without being affected by the thickness of the substrate 1 and the like in curing the respective layers by irradiating ultraviolet light.

Figure 3:
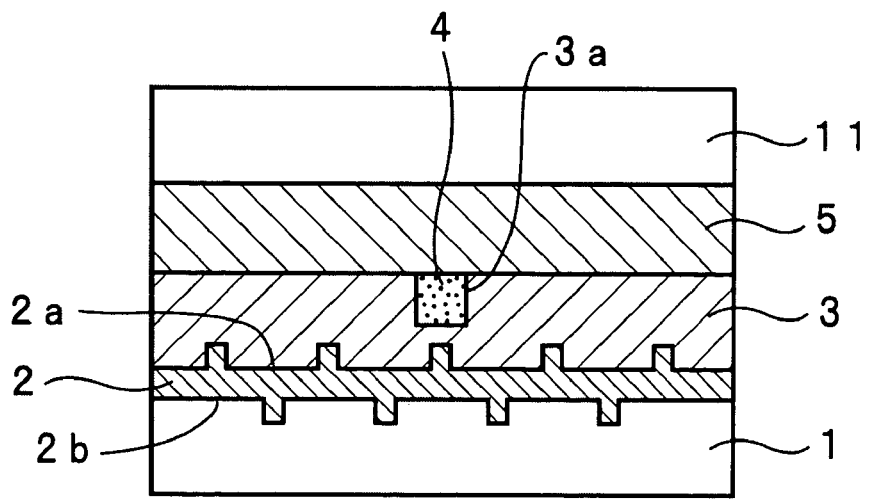
FIG. 3 is a sectional view showing an optical waveguide of a further embodiment according to the present invention.

FIG. 3 is a sectional view showing an optical waveguide of a further embodiment according to the present invention. In the embodiment shown in FIG. 3, an upper substrate 11 is provided on the upper clad layer 5. As the upper substrate 11, there is given a substrate consisting of quartz, TEMPAX, Pyrex® glass, polyimide fluoride or the like.

An optical waveguide of the embodiment shown in FIG. 3 can be obtained, for example, by a method of placing the upper substrate 11 on the upper clad layer 5 prior to curing the upper clad layer 5 and then curing it in fabrication steps of the embodiment shown in FIG. 1.

Also in the embodiment shown in FIG. 3, by proving the ultraviolet control region 2, the lower clad layer 3, the core layer 4 and the upper clad layer 5 can be formed in such a way that the refractive indexes of the respective layers are uniform without being affected by the thickness of the substrate 1 and the like in curing the respective layers by irradiating ultraviolet light to these layers.

Figure 4:
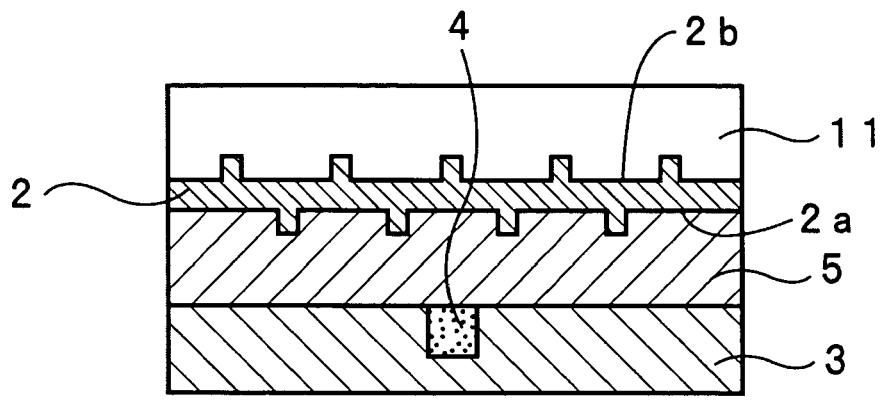
FIG. 4 is a sectional view showing an optical waveguide of a further embodiment according to the present invention.

FIG. 4 is a sectional view showing an optical waveguide of a further embodiment according to the present invention. In the embodiment shown in FIG. 4, the ultraviolet control region 2 is provided between the upper substrate 11 and the upper clad layer 5. And, a substrate is not provided under the lower clad layer 3. Such an optical waveguide can be fabricated, for example, by forming the ultraviolet control region 2, the upper clad layer 5, the core layer 4, and the lower clad layer 3 one by one on the upper substrate 11.

Figure 11:
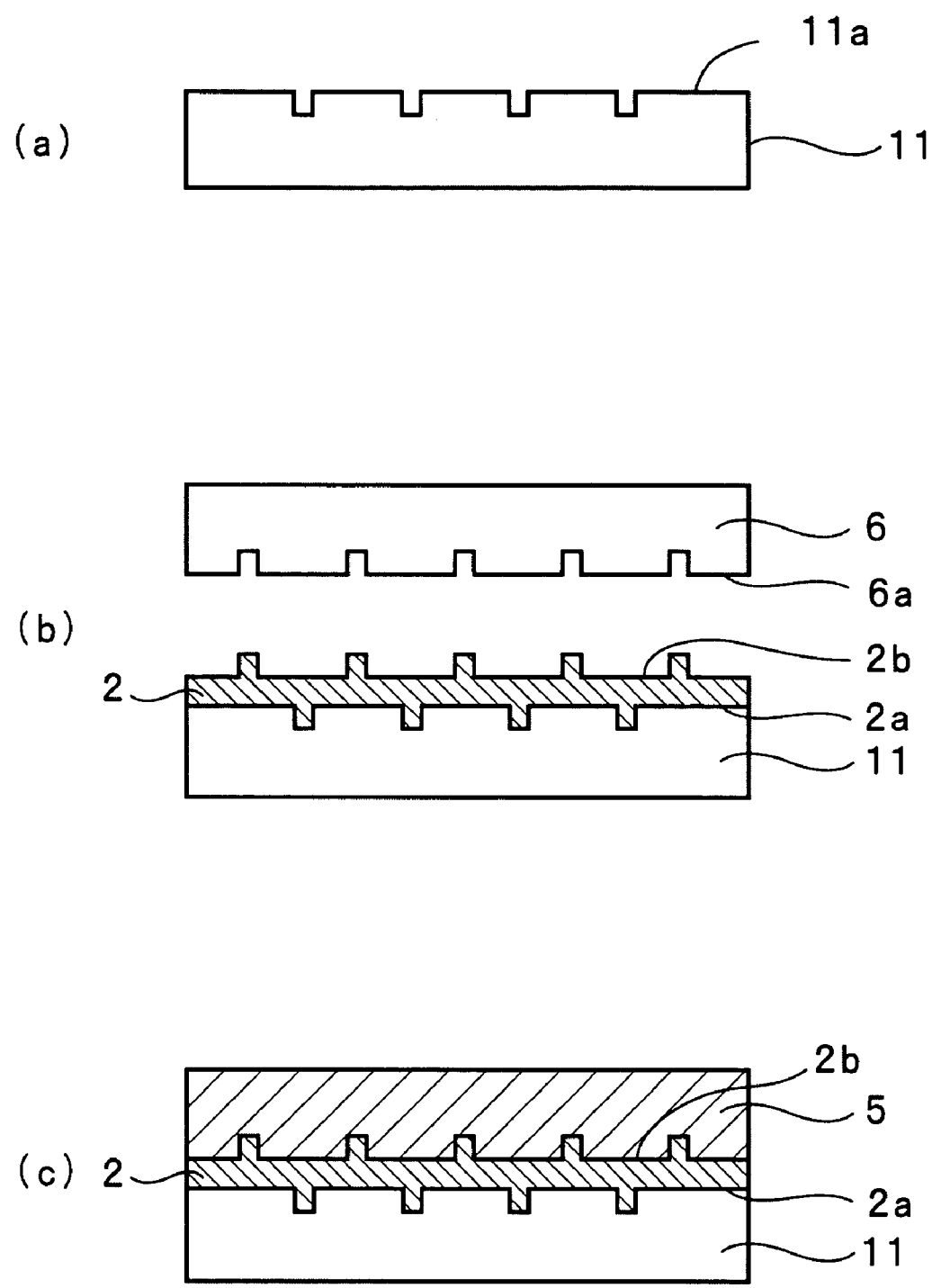
FIG. 11 is a sectional view showing fabrication steps of the embodiment shown in FIG. 4.
Figure 12:
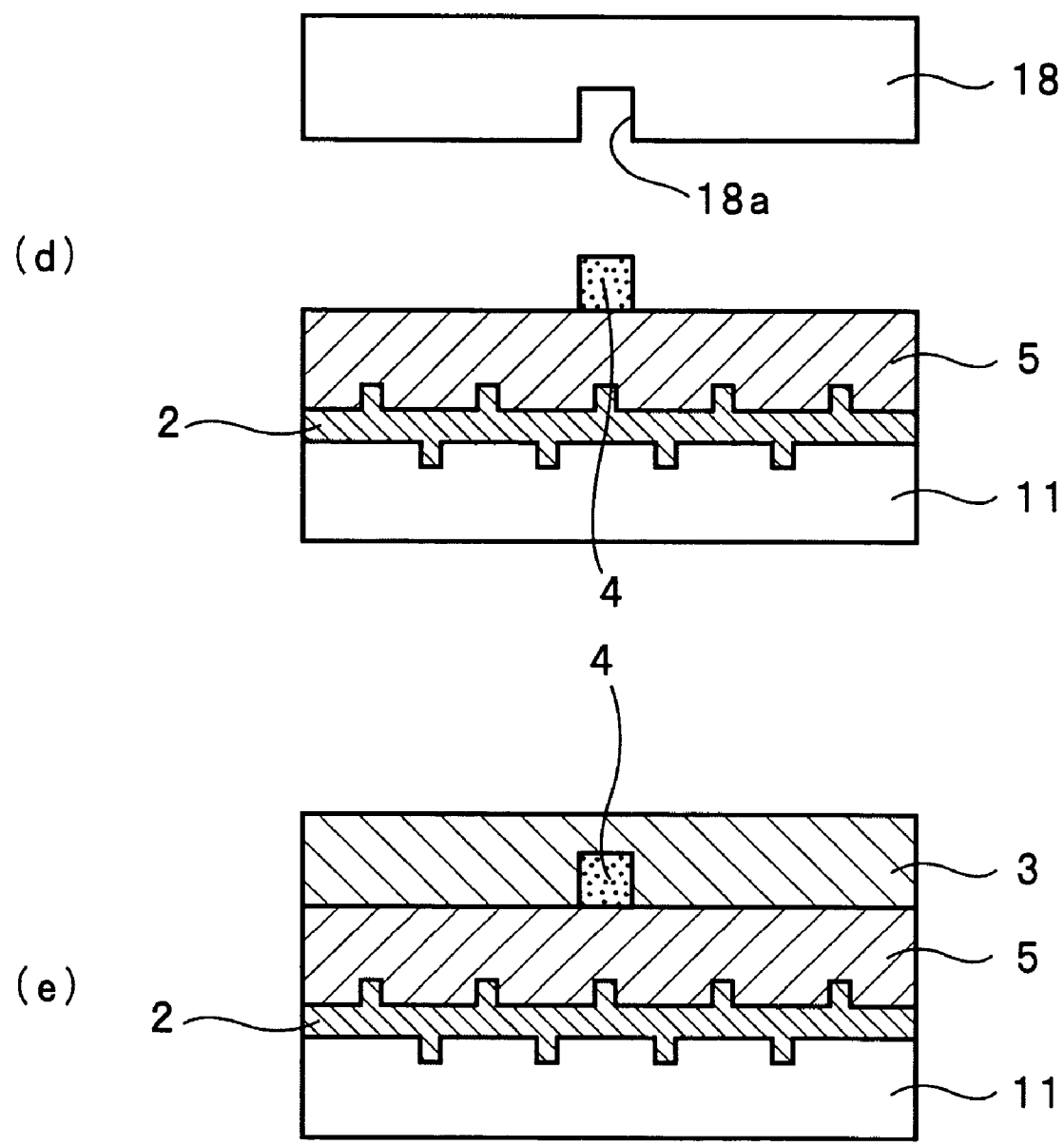
FIG. 12 is a sectional view showing fabrication steps of the embodiment shown in FIG. 4.

FIG. 11 and FIG. 12 are a sectional view showing process steps fabricating an optical waveguide of the embodiment shown in FIG. 4.

As shown in FIG. 11(a), recesses and projections 11a corresponding to recesses and projections 2a of the ultraviolet control region 2 is formed on the surface of the upper substrate 11. Next, as shown in FIG. 11(b), after liquid consisting of a precursor of an organic-inorganic composite material is added dropwise onto the upper substrate 11, an ultraviolet control region 2 is irradiated with ultraviolet light with a mold 6 being pressed against the ultraviolet control region 2 and cured. Recesses and projections 6a corresponding to recesses and projections 2b of the ultraviolet control region 2 are formed on the mold 6. In this embodiment, the mold 6 is formed from Si.

Next, as shown in FIG. 11(c), a solution consisting of a precursor of an organic-inorganic composite material is added dropwise onto the ultraviolet control region 2 and after spin coating is applied, the solution was cured by irradiating ultraviolet light to form the upper clad layer 5.

Next, as shown in FIG. 12 (d), after a solution consisting of a precursor of an organic-inorganic composite material is added dropwise onto the upper clad layer 5, a mold 18, in which a groove 18a corresponding to a pattern of a core layer is formed, is pressed against the solution and the solution is cured by irradiating ultraviolet light to the inside of the groove 18a and to form a core layer 4. Next the mold 18 is removed, and a solution consisting of a precursor of an organic-inorganic composite material is added dropwise onto the core layer 4 and the upper clad layer 5, and after spin coating is applied, the solution was cured by irradiating ultraviolet light to form the lower clad layer 3, as shown in FIG. 12(e).

In this embodiment, since the ultraviolet control region 2 is provided between the upper substrate 11 and the upper clad layer 5, when curing the upper clad layer 5, the core layer 4 and the lower clad layer 3 by irradiating ultraviolet light to these layers, the ultraviolet light reflected at the upper substrate 11 and entering the respective layers again can be suppressed. Therefore, the respective layers can be formed in such a way that the refractive indexes of the respective layers are uniform without being affected by the thickness of the upper substrate 11 and the like.

Figure 5:
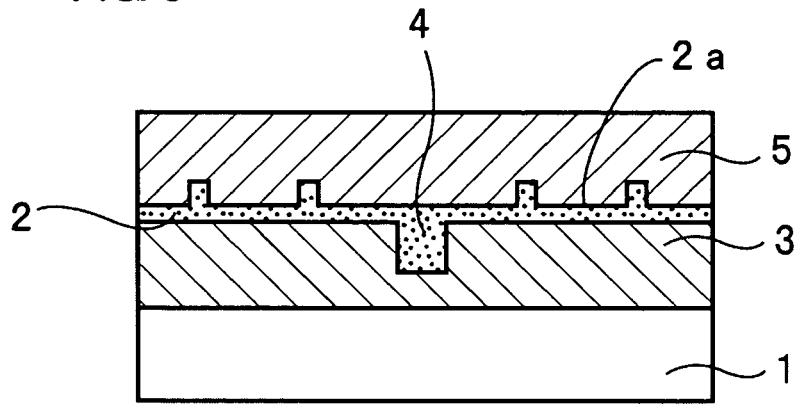
FIG. 5 is a sectional view showing an optical waveguide of a further embodiment according to the present invention.

FIG. 5 is a sectional view showing an optical waveguide of further embodiment according to the present invention. In this embodiment, the ultraviolet control region 2 is provided on an interface of the lower clad layer 3 and the upper clad layer 5. Recesses and projections 2a are formed on the surface of the ultraviolet control region 2 contacting with the upper clad layer 5. Since the ultraviolet control region 2 is provided on the core layer 4 and the lower clad layer 3, it is possible to inhibit the ultraviolet light from entering the core layer 4, the lower clad layer 3 and the substrate 1 in curing the upper clad layer 5 by irradiating ultraviolet light to this layer. Therefore, when curing the upper clad layer 5, the upper clad layer 5 can be cured in such a way that its refractive index is uniform without being affected by the thickness of the substrate 1 and the like.

Figure 13:
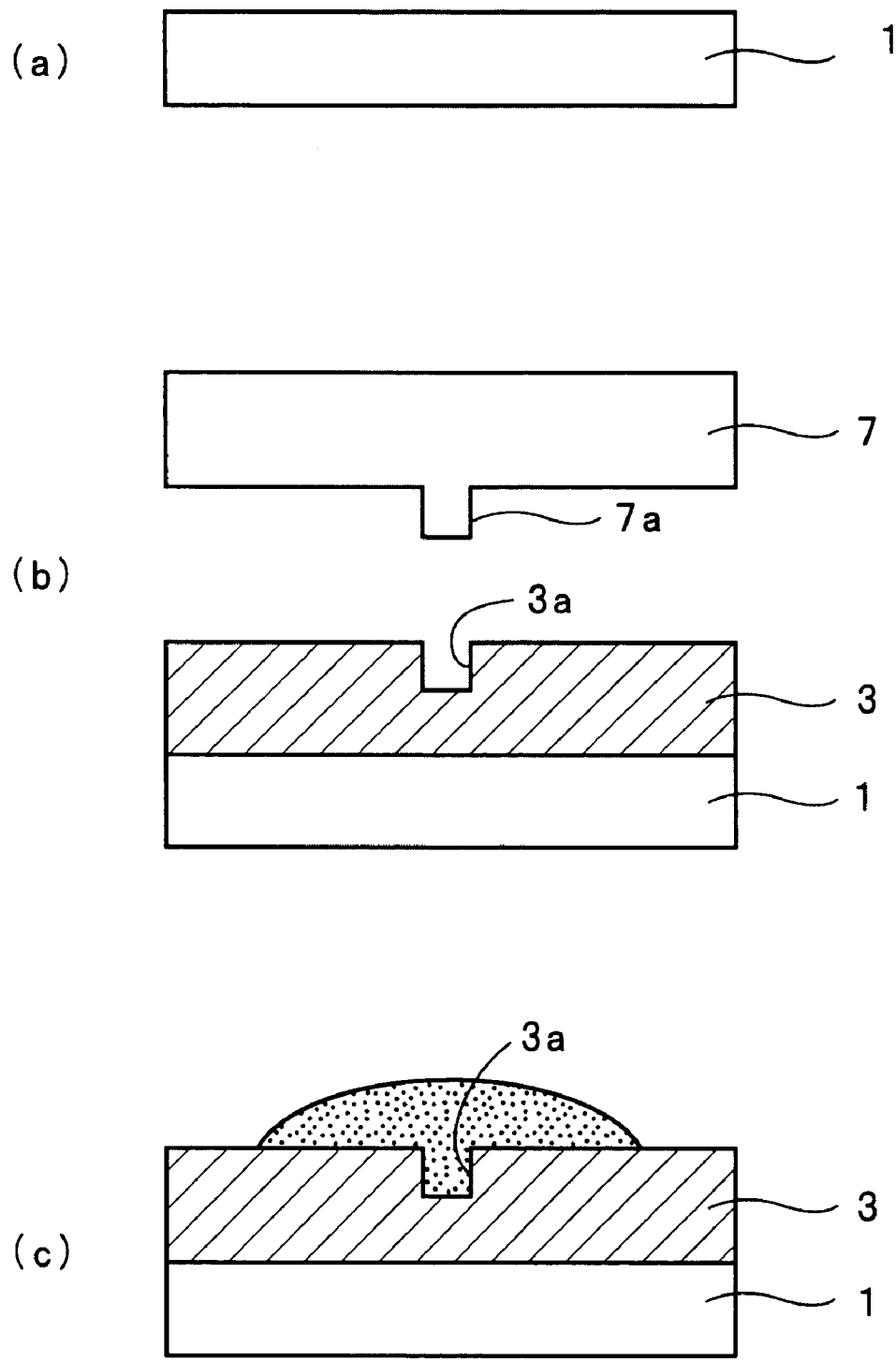
FIG. 13 is a sectional view showing fabrication steps of the embodiment shown in FIG. 5.
Figure 14:
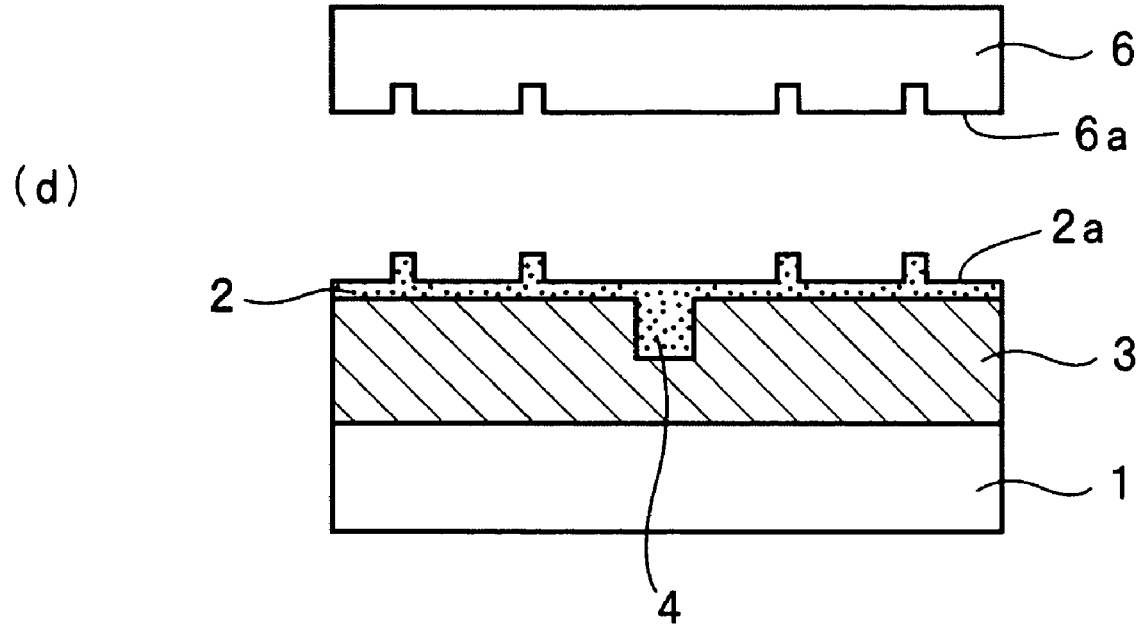
FIG. 14 is a sectional view showing fabrication steps of the embodiment shown in FIG. 5.
Figure 14:
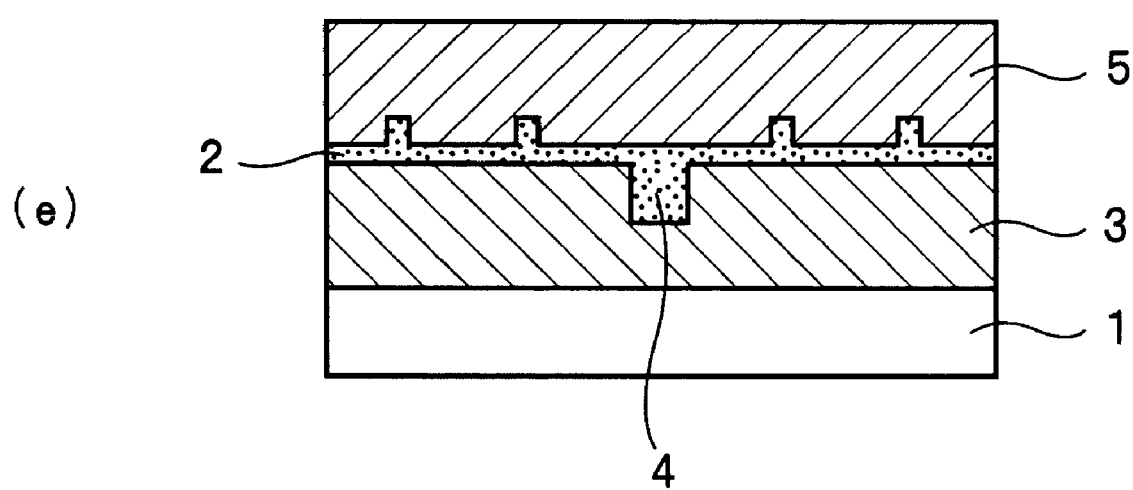

FIG. 13 and FIG. 14 are a sectional view showing process steps fabricating an optical waveguide of the embodiment shown in FIG. 5.

After a solution consisting of a precursor of an organic-inorganic composite material is added dropwise onto the substrate 1 shown in FIG. 13(a), as shown in FIG. 13(b), the solution is irradiated with ultraviolet light with a mold 7 having a projection portion 7a formed corresponding to a core pattern being pressed against the solution and cured to form a lower clad layer 3. A groove 3a corresponding to the projection portion 7a of the mold 7 is formed in the lower clad layer 3.

Next, as shown in FIG. 13(c), liquid consisting of a precursor of an organic-inorganic composite material is added dropwise into the groove 3a in the lower clad layer and onto the lower clad layer 3.

Next, as shown in FIG. 14(d), the liquid is irradiated with ultraviolet light with a mold 6 having recesses and projections 6a corresponding to recesses and projections 2a of a ultraviolet control region 2 being pressed against the liquid, and cured to form a core layer 4 and an ultraviolet control region 2. Accordingly, in this embodiment, the ultraviolet control region 2 is formed from the same material as the core layer 4. Recesses and projections 2a corresponding to recesses and projections 6a of the mold 6 are formed on the surface of the ultraviolet control region 2. In this embodiment, the mold 6 is formed from Si.

Next, as shown in FIG. 14(e), a clad material consisting of a precursor of an organic-inorganic composite material is added dropwise onto the ultraviolet control region 2 and after spin coating is applied, the clad material was cured by irradiating ultraviolet light to form the upper clad layer 5.

In this embodiment, since the ultraviolet control region 2 is provided on the core layer 4 and the lower clad layer 3, it is possible to inhibit the ultraviolet light from entering the core layer 4, the lower clad layer 3 and the substrate 1 in curing the upper clad layer 5. Therefore, when curing the upper clad layer 5, an effect of the ultraviolet light reflected from the substrate 1 can be suppressed and the upper clad layer 5 can be formed in such a way that its refractive index is uniform.

The solutions for forming organic-inorganic composite materials to be used in order to form respective layers in the following examples were prepared as follows.

Solution for Forming a Clad Layer 5.5 ml of 3-methacryloxypropyltriethoxysilane (MPTES), 20.5 ml of ethanol, 1.65 ml of hydrochloric acid (2N) and 4.5 ml of phenyltrimethoxysilane were mixed and left standing at 24° C. for 72 hours, and then to this, 1-hydroxy-cyclohexyl-phenyl ketone, which is a photopolymerization initiator, was added in an amount 1% by weight in order to accelerate ultraviolet-curing. 4 ml of this mixture was poured into a small bottle and then heated at 100° C. for one hour to obtain 1 g of viscous liquid. Into this viscous liquid, trimethylethoxysilane: 3 ml and
trifluoroacetic anhydride: 0.8 ml were mixed and the mixture was left standing for 24 hours, and then by heating and drying the mixture to 100° C., excessive trimethylethoxysilane and trifluoroacetic anhydride were evaporated and removed from the mixture to obtain a solution A for forming a clad layer.

Figure 25:
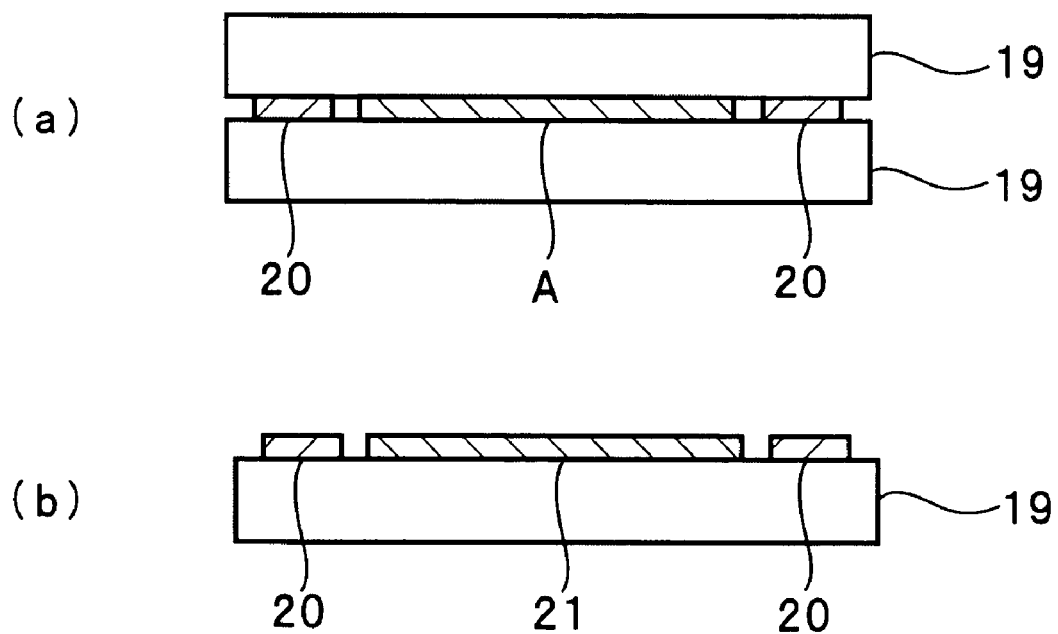
FIG. 25 is a sectional view for illustrating a method of measuring a refractive index of an organic-inorganic composite material.

As shown in FIG. 25(a), the solution A was added onto a TEMPAX glass 19 of 1.1 mm in thickness, and spacers 20 having a thickness of 30 μm were placed on this glass, and another TEMPAX glass 19 having the same thickness was placed on the spacers with the solution A being sandwiched between two glasses. Next, this sandwiched solution was cured by irradiating ultraviolet light for 30 minutes with an ultraviolet lamp having a central wavelength of 365 nm and intensity of 150 mW/cm$^2$ in an atmosphere of nitrogen of 24° C. After curing, one TEMPAX glass was removed and an organic-inorganic composite material 21 was formed as shown in FIG. 25(b), and a refractive index thereof was measured at a wavelength of 630 nm to obtain a value of 1.515.

Solution for Forming a Core Layer 5.5 ml of 3-methacryloxypropyltriethoxysilane (MPTES), 20.5 ml of ethanol, 1.65 ml of hydrochloric acid (2N) and 5.75 ml of phenyltrimethoxysilane were mixed and left standing at 24° C. for 72 hours, and then to this, 1-hydroxy-cyclohexyl-phenyl ketone, which is a photopolymerization initiator, was added in an amount 1% by weight in order to accelerate ultraviolet-curing. 4 ml of this mixture was poured into a small bottle and then heated at 100° C. for one hour to obtain 1 g of viscous liquid. Into this viscous liquid, trimethylethoxysilane: 3 ml and
trifluoroacetic anhydride: 0.8 ml were mixed and the mixture was left standing for 24 hours, and then by heating the mixture to 100° C., excessive trimethylethoxysilane and trifluoroacetic anhydride were evaporated and removed from the mixture to obtain a solution B for forming a core layer.

Using the same procedure as that described above, a refractive index of an organic-inorganic composite material formed from the solution B was measured to obtain a value of 1.519.

Solution 1 for Forming an Ultraviolet Control Region 5.5 ml of 3-methacryloxypropyltriethoxysilane (MPTES), 20.5 ml of ethanol, 1.65 ml of hydrochloric acid (2N) and 6.0 ml of phenyltrimethoxysilane were mixed and left standing at 24° C. for 72 hours, and then to this, 1-hydroxy-cyclohexyl-phenyl ketone, which is a photopolymerization initiator, was added in an amount 1% by weight in order to accelerate ultraviolet-curing. 4 ml of this mixture was poured into a small bottle and then heated at 100° C. for one hour to obtain 1 g of viscous liquid. Into this viscous liquid, trimethylethoxysilane: 3 ml and
trifluoroacetic anhydride: 0.8 ml were mixed and the mixture was left standing for 24 hours, and then by heating the mixture to 100° C., excessive trimethylethoxysilane and trifluoroacetic anhydride were evaporated and removed from the mixture to obtain a solution C for forming an ultraviolet control region.

Using the same procedure as that described above, a refractive index of an organic-inorganic composite material formed from the solution C was measured to obtain a value of 1.522.

Solution 2 for Forming an Ultraviolet Control Region 5.5 ml of 3-methacryloxypropyltriethoxysilane (MPTES), 20.5 ml of ethanol, 1.65 ml of hydrochloric acid (2N) and 7.0 ml of phenyltrimethoxysilane were mixed and left standing at 24° C. for 72 hours, and then to this, 1-hydroxy-cyclohexyl-phenyl ketone, which is a photopolymerization initiator, was added in an amount 1% by weight in order to accelerate ultraviolet-curing. 4 ml of this mixture was poured into a small bottle and then heated at 100° C. for one hour to obtain 1 g of viscous liquid. Into this viscous liquid, trimethylethoxysilane: 3 ml and
trifluoroacetic anhydride: 0.8 ml were mixed and the mixture was left standing for 24 hours, and then by heating the mixture to 100° C., excessive trimethylethoxysilane and trifluoroacetic anhydride were evaporated and removed from the mixture to obtain a solution D for forming an ultraviolet control region.

Using the same procedure as that described above, a refractive index of an organic-inorganic composite material formed from the solution D was measured to obtain a value of 1.524.

EXAMPLE 1

Measurement of a Refractive Index

In order to evaluate the effects of providing the ultraviolet control region 2 on the control of refractive index in the lower clad layer 3 in the embodiment shown in FIG. 1, an ultraviolet control region 2 was formed on each substrate 1 using substrates 1 having different thicknesses, and a lower clad layer 3 was formed on the ultraviolet control region 2, and a refractive index of the lower clad layer 3 was measured in the embodiment shown in FIG. 1. Specifically, substrates having a thickness of 0.5 mm, 1.1 mm, 1.6 mm and 2.1 mm, respectively, were used as the substrate 1. Recesses and projections 1a (refer to FIG. 8(a)) were formed by forming grooves of 400 nm in width and 400 nm in depth with 400 nm pitches on the surface of the substrate 1 using a dicing saw. Onto this, the solution C was added dropwise, and then as shown in FIG. 8(b), it was cured by irradiating ultraviolet light for 30 minutes with an ultraviolet lamp having a central wavelength of 365 nm and intensity of 150 mW/cm² with a mold 6, having recesses and projections 6a in which surface roughness Rz per a length of 250 μm was 100 nm, being pressed against the solution to form an ultraviolet control region 2. Incidentally, ultraviolet curing was conducted in an atmosphere of nitrogen. Any ultraviolet-curing operations in process steps described below were conducted in an atmosphere of nitrogen. The thickness of the ultraviolet control region 2 was 2 μm.

Surface roughness of the surface of the ultraviolet control region 2 was measured using a stylus surface meter. As a result of this, surface roughness Rz per a length of 250 μm was 100 nm.

Next, the solution A was added dropwise onto the ultraviolet control region 2 and the solution A was cured by irradiating ultraviolet light for 30 minutes with an ultraviolet lamp having a central wavelength of 365 nm and intensity of 150 mW/cm² to form a lower clad layer 3. The thickness of the lower clad layer 3 was 30 μm.

Refractive index measurements were made on each sample in which the lower clad layer 3 was thus formed. As a result of this, the refractive index was a constant value of 1.5155 in any samples having different thicknesses.

As a comparative example, there was fabricated a sample, in which using the solution A, a lower clad layer 3 was formed directly on the substrate 1 without forming the ultraviolet control region 2, for each of the substrates having different thicknesses. The lower clad layer 3 was formed in such a way that its thickness is 30 μm similar to the above case. With respect to the samples obtained, the refractive indexes were measured. As a result of this, the refractive index was 1.5155 in a sample of the substrate of 2.1 mm in thickness, 1.5153 in a sample of the substrate of 1.6 mm in thickness, 1.5150 in a sample of the substrate of 1.1 mm in thickness and 1.5148 in a sample of the substrate of 0.5 mm in thickness. Therefore, it was verified that in the case of not providing the ultraviolet control region 2, variations in refractive indexes occur depending on the thicknesses of the substrates.

It was found from the above results that by proving the ultraviolet control region, the refractive index of the lower clad layer could be controlled so as to be uniform without being affected by the thickness of the substrate.

Fabrication of Four-Branch Optical Waveguide

Figure 15:
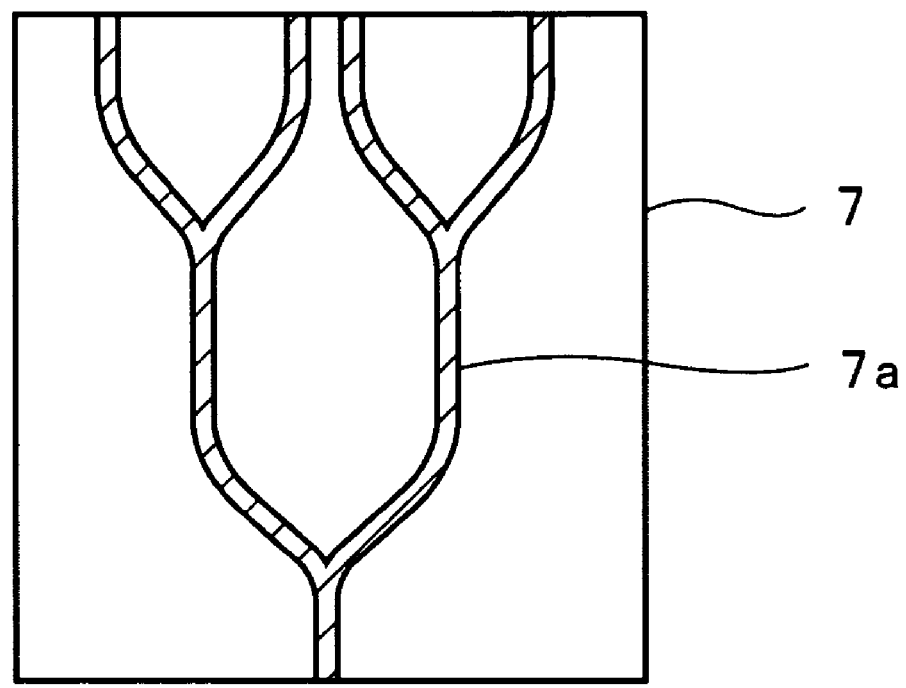
FIG. 15 is a plan view showing a mold used in fabricating a four-branch optical waveguide in embodiments of the present invention.

After an ultraviolet control region 2 was formed on each of substrates having different thicknesses in the same way as described above, the solution A was added dropwise onto this ultraviolet control region 2 and a lower clad layer 3 was formed by pressing a mold 7, in which a pattern 7a of a core layer is a four-branch pattern as shown in FIG. 15, against the solution A. The lower clad layer 3 was cured by irradiating ultraviolet light under the conditions similar to that described above. A pattern of a groove 3a corresponding to the projection portion pattern 7a was formed in the lower clad layer 3 as shown in FIG. 8(c).

Next, as shown in FIG. 9(d), the solution B was poured into the groove 3a in the lower clad layer 3 and cured by irradiating ultraviolet light for 30 minutes with an ultraviolet lamp having a central wavelength of 365 nm and intensity of 150 mW/cm² to form a core layer 4.

Next, as shown in FIG. 9(e), after the solution A was added dropwise onto the core layer 4 and the lower clad layer 3, the solution A was cured by irradiating ultraviolet light for 30 minutes with an ultraviolet lamp having a central wavelength of 365 nm and intensity of 150 mW/cm² to form an upper clad layer 5.

Thus, there was fabricated a four-branch optical waveguide which has a section shown in FIG. 1 and has a core pattern similar to a projection portion 7a shown in FIG. 15 for each of the substrates having different thicknesses. The thickness of the ultraviolet control region 2 was 2 μm, the thicknesses of the lower clad layer 3 and the upper clad layer 5 were 30 μm, respectively, and both the thickness and the width of the core layer 4 were 7 μm.

Measurement of Insertion Loss

Figure 16:
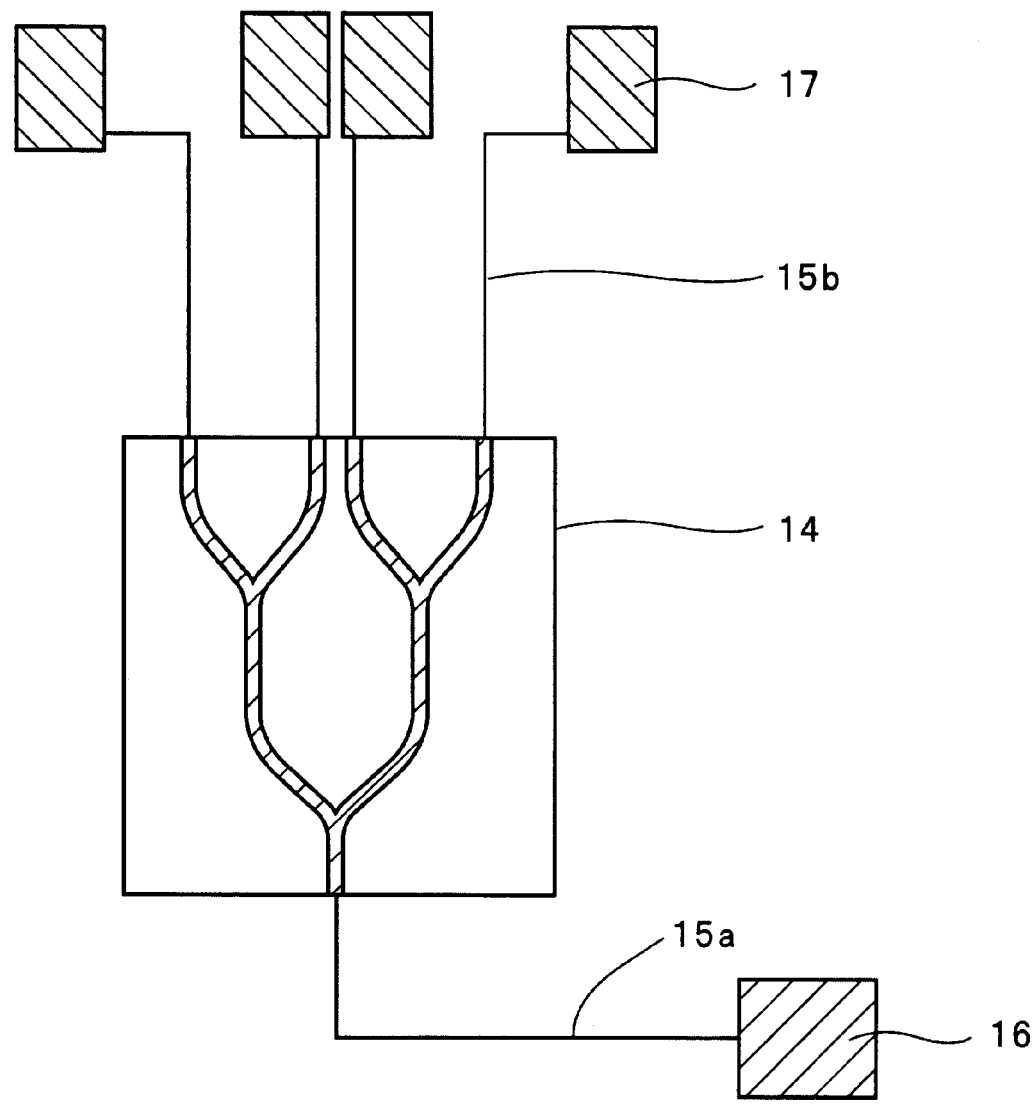
FIG. 16 is a schematic view showing an apparatus for measuring the insertion loss of the four-branch optical waveguide.

The insertion loss of each of the above four-branch optical waveguides was measured. As shown in FIG. 16, light with a wave length of 1,300 nm emitted from a photo diode 16 enters the four-branch optical waveguide 14 through an optical fiber 15a and exits the optical waveguide 14 and was transmitted to a photo diode 17 through an optical fiber 15b. This transmitted light was detected by the photo diode 17 to determine an output. As a result of this, the insertion losses of the four-branch optical waveguide 14 were 8.3 dB to 8.5 dB and the branch-to-branch variations of the insertion loss was 0.2 dB.

Figure 24:
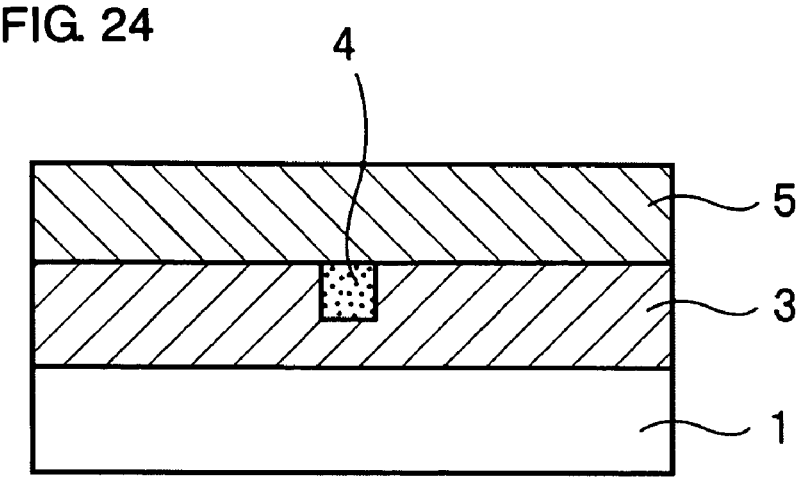
FIG. 24 is a sectional view showing a conventional optical waveguide.

As a comparative example, there was fabricated an optical waveguide having a structure shown in FIG. 24. That is, a four-branch optical waveguide was fabricated using each of the substrates having different thicknesses by following the same procedure as described above except for not forming the ultraviolet control region 2. With respect to the optical waveguide obtained, the insertion losses were measured in the same way as described above. As a result of this, branch-to-branch variations of the insertion loss was 0.6 dB in an optical waveguide having the substrate of 2.1 mm in thickness, 0.4 dB in an optical waveguide having the substrate of 1.6 mm in thickness, 0.2 dB in an optical waveguide having the substrate of 1.1 mm in thickness and 0.4 dB in an optical waveguide having the substrate of 0.5 mm in thickness.

It was found from the above results that by proving the ultraviolet control region 2 under the lower clad layer 3, the clad layers can be formed in such a way that the refractive indexes of the clad layers are uniform without being affected by the thickness of the substrate and the like and consequently the insertion losses of the optical waveguide can be consistent.

EXAMPLE 2

A four-branch optical waveguide was fabricated for each of the substrates having different thicknesses by following the same procedure as in Example 1 except for using a mold 6 having recesses and projections, the surface roughness Rz of which was 400 nm, as a mold for forming recesses and projections on the surface of the ultraviolet control region 2 in Example 1.

The fabricated four-branch optical waveguide was observed with an optical microscope, and as a result of this, any of recesses and projections on the surface of the substrate and on an interface of the lower clad layer and the ultraviolet control region has the surface roughness Rz per a length of 250 μm of 400 nm.

And, the insertion losses of the four-branch optical waveguides were measured in the same way as in Example 1. As a result of this, branch-to-branch variations of the insertion loss were 0.2 dB in any cases of using the substrates having different thicknesses.

It was found from the above results that the same effects as in Example 1 could be attained even when the surface roughness Rz of the recesses and projections on the interface of the ultraviolet control region and the lower clad layer was 400 nm.

EXAMPLE 3

Figure 7:
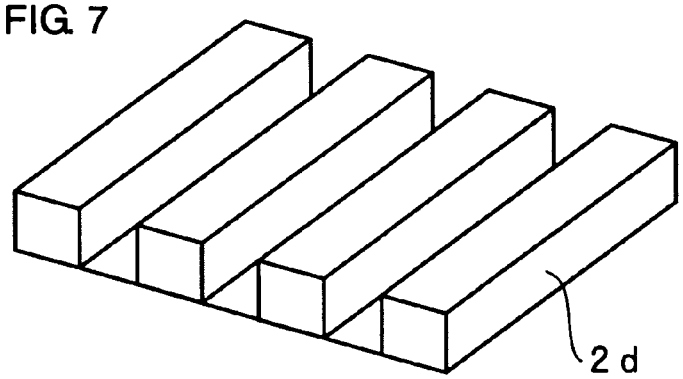
FIG. 7 is a perspective view showing another example of recesses and projections to be formed in an ultraviolet control region.

As a mold 6 for forming recesses and projections on the surface of the ultraviolet control region 2, a mold with the configuration of recesses and projections having the form of stripes, which having a projection portions 2d having the form of stripes as shown in FIG. 7. In addition, the surface roughness Rz of these recesses and projections was 100 nm.

A four-branch optical waveguide was fabricated for each of the substrates having different thicknesses by following the same procedure as in Example 1 except for using the above-mentioned mold 6. The fabricated four-branch optical waveguide was observed with an optical microscope, and as a result of this, the surface roughness Rz per a length of 250 μm of recesses and projections on an interface of the lower clad layer and the ultraviolet control region was 100 nm.

And, the insertion losses of the four-branch optical waveguides were measured in the same way as in Example 1. As a result of this, branch-to-branch variations of the insertion loss were 0.2 dB in any substrates having different thicknesses.

It was found from the above results that the same effects as in Example 1 could be attained even when the recesses and projections on the interface of the ultraviolet control region and the lower clad layer have the form of stripes.

EXAMPLE 4

An optical waveguide having a sectional structure shown in FIG. 5, in which the ultraviolet control region was formed on the interface of the upper clad layer and the lower clad layer 3, was fabricated.

Substrates having different thicknesses, which are similar to Example 1, were used. Further, recesses and projections were not formed on these substrates 1. After the solution A was added dropwise onto the substrate 1, a mold 7 was pressed against the solution A as shown in FIG. 13(b) using the mold 7 having a pattern of a projection portion 7a shown in FIG. 15, and the solution A was cured by irradiating ultraviolet light for 30 minutes with an ultraviolet lamp having a central wavelength of 365 nm and intensity of 150 mW/cm$^2$ to form a lower clad layer 3.

Next, as shown in FIG. 13(c), the solution B was added dropwise onto the lower clad layer 3 and into a groove 3a in the lower clad layer 3 and cured by irradiating ultraviolet light for 30 minutes with an ultraviolet lamp having a central wavelength of 365 nm and intensity of 150 mW/cm$^2$ with a mold 6, having recesses and projections 6a in which surface roughness Rz per a length of 250 μm was 100 nm, being pressed against the solution B as shown in FIG. 14(d) to form an ultraviolet control region 2 and a core layer 4. In this embodiment, the same materials were used for the core layer as ultraviolet control region.

Next, as shown in FIG. 14(e), after the solution A was added dropwise onto the ultraviolet control region 2, the solution A was cured by irradiating ultraviolet light for 30 minutes with an ultraviolet lamp having a central wavelength of 365 nm and intensity of 150 mW/cm$^2$ to form an upper clad layer 5.

In the resulting four-branch optical waveguide, the thickness of the ultraviolet control region 2 was 2 μm, the thicknesses of the lower clad layer 3 and the upper clad layer 5 were 30 μm, respectively, and the thickness and the width of the core layer 4 were 7 μm, respectively.

The four-branch optical waveguide obtained was observed with an optical microscope, and as a result of this, the surface roughness Rz per a length of 250 μm of recesses and projections on an interface of the ultraviolet control region 2 and the upper clad layer 5 was 100 nm.

The insertion losses of the four-branch optical waveguides obtained were measured in the same way as in Example 1. As a result of this, branch-to-branch variations of the insertion loss were 0.2 dB in any substrates having different thicknesses.

It was found from the above results that the same effects as in Example 1 can also be attained when the ultraviolet control region 2 was provided on the interface of the lower clad layer 3 and the upper clad layer 5.

EXAMPLE 5

A four-branch optical waveguide having a sectional structure shown in FIG. 4 was fabricated as follows.

Four kinds of substrates having a thickness of 0.5 mm, 1.1 mm, 1.6 mm and 2.1 mm, respectively, were used as the upper substrate, and grooves of 400 nm in width and 400 nm in depth with 400 nm pitches were formed on the surface of the substrate 11 using a dicing saw. Onto the surface of such recesses and projections of the substrate 11, the solution C was added dropwise, and then as shown in FIG. 11(*b*), a mold 6, having recesses and projections 6*a* of which surface roughness Rz per a length of 250 μm was 100 nm, was pressed against the solution C, and in this state the solution C was cured by irradiating ultraviolet light for 30 minutes with an ultraviolet lamp having a central wavelength of 365 nm and intensity of 150 mW/cm$^2$ to form an ultraviolet control region 2.

Next, as shown in FIG. 11(*c*), the solution A was added dropwise onto the ultraviolet control region 2 and after spin coating is applied, the solution A was cured by irradiating ultraviolet light for 30 minutes with the same ultraviolet lamp as described above to form the upper clad layer 5.

Next, as shown in FIG. 12(*d*), after the solution B was added dropwise onto the upper clad layer 5, a mold 18, in which a groove 18*a* of a core pattern is formed, was pressed against the solution B and the solution B was cured by irradiating ultraviolet light for 30 minutes with an ultraviolet lamp similar to the lamp described above to form a core layer 4. Incidentally, the groove 18*a* of the mold 18 is formed in the same core pattern as a projection portion 7*a* of a mold 7 shown in FIG. 15.

Next, as shown in FIG. 12(*e*), after the solution A was added dropwise onto the core layer 4 and the upper clad layer 5, the solution A was cured by irradiating ultraviolet light for 30 minutes with the above-mentioned ultraviolet lamp to form an lower clad layer 3.

In the four-branch optical waveguide thus fabricated, the thickness of the ultraviolet control region 2 was 2 μm, the thicknesses of the lower clad layer 3 and the upper clad layer 5 were 30 μm, respectively, and both the thickness and the width of the core layer 4 were 7 μm.

The four-branch optical waveguide obtained was observed with an optical microscope, and as a result of this, the surface roughness Rz per a length of 250 μm of recesses and projections on the surface of the upper substrate was 400 nm and the surface roughness Rz per a length of 250 μm of recesses and projections on an interface of the ultraviolet control region and the upper clad layer was 100 nm.

The insertion losses of the four-branch optical waveguides were measured in the same way as in Example 1. As a result of this, branch-to-branch variations of the insertion loss were 0.2 dB in any cases irrespective of the thickness of the substrates.

It was found from the above results that the same effects as in Example 1 could also be attained when the ultraviolet control region 2 was provided between the upper clad layer and the substrate.

EXAMPLE 6

Figure 17:
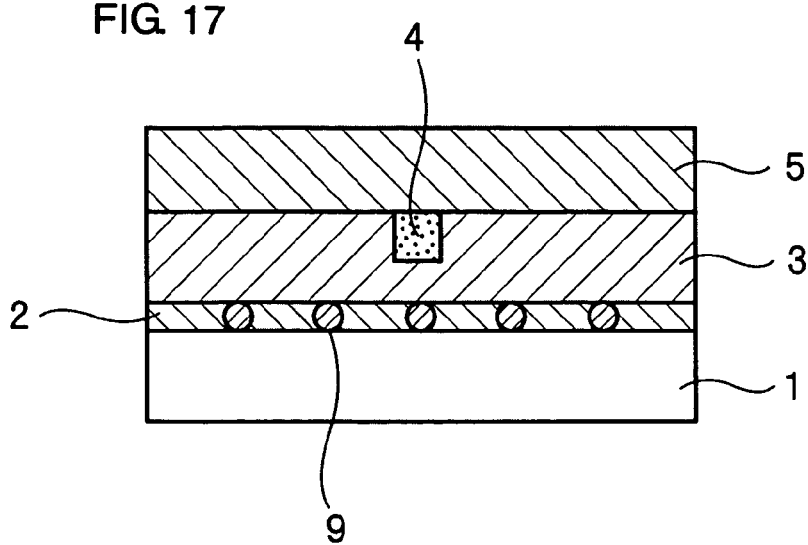
FIG. 17 is a sectional view showing an optical waveguide of a further embodiment according to the present invention.

A four-branch optical waveguide of an embodiment shown in FIG. 17 was fabricated.

Onto the substrates similar to Example 1, having different thicknesses, the solution C, into which glass particles of 1 μm in diameter were mixed so as to be the content of 1 mg/ml, was added dropwise, and spin coating is applied, the solution C was then cured by irradiating ultraviolet light for 30 minutes with the above-mentioned ultraviolet lamp to form the ultraviolet control region 2 containing the glass particles 9 as a component of scattering light.

A lower clad layer 3, a core layer 4 and an upper clad layer 5 were formed by the same procedure as in Example 1.

In the four-branch optical waveguide fabricated, the thickness of the ultraviolet control region 2 was 2 μm, the thicknesses of the lower clad layer 3 and the upper clad layer 5 were 30 μm, respectively, and both the thickness and the width of the core layer 4 were 7 μm.

The insertion losses were measured in the same way as in Example 1. As a result of this, branch-to-branch variations of the insertion loss were constant at 0.2 dB irrespective of the thickness of the substrates and there was no effect of the thickness of the substrate.

EXAMPLE 7

Figure 18:
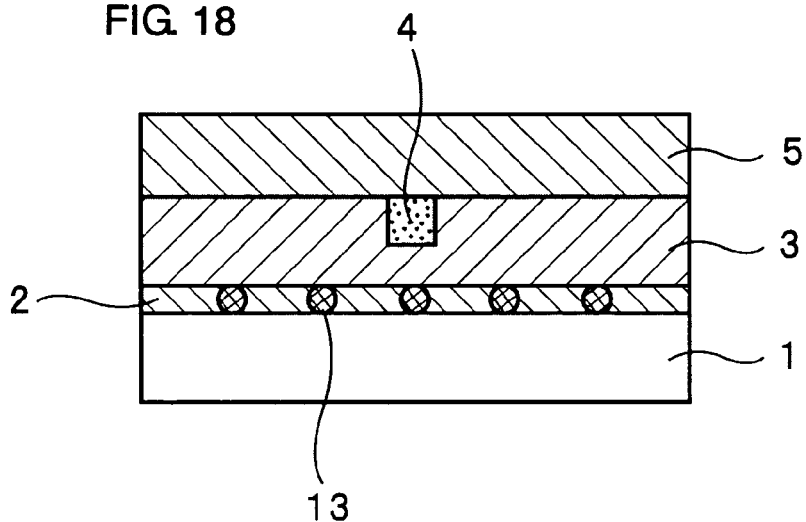
FIG. 18 is a sectional view showing an optical waveguide of a further embodiment according to the present invention.

A four-branch optical waveguide of an embodiment shown in FIG. 18 was fabricated. The four-branch optical waveguide was fabricated by following the same procedure as in Example 6 described above except for using the solution C, into which carbon particles 13 were mixed so as to be the content of 1 mg/ml.

The branch-to-branch variations of the insertion losses were measured in the same way as in Example 1 to obtain a constant value of 0.2 dB and there was no effect of the thickness of the substrates.

EXAMPLE 8

Figure 19:
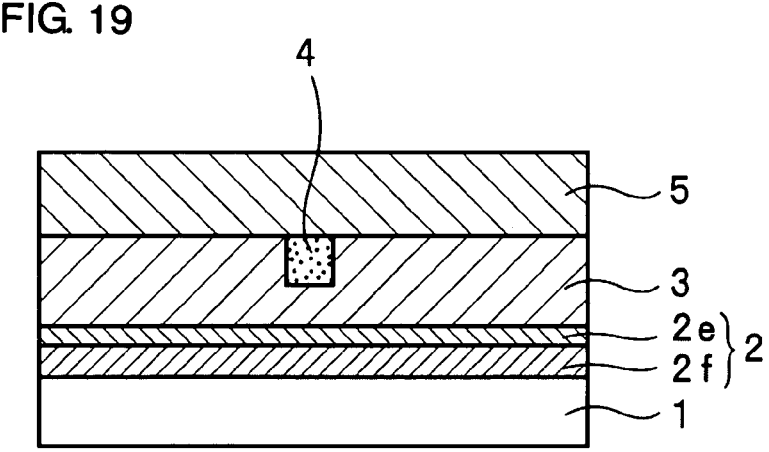
FIG. 19 is a sectional view showing an optical waveguide of a further embodiment according to the present invention.

A four-branch optical waveguide of an embodiment shown in FIG. 19 was fabricated.

An ultraviolet control region 2 was composed of two layers 2*e* and 2*f* using substrates having different thicknesses, which were similar to Example 1. The first layer 2*f* was formed from the solution C and the second layer 2*e* was formed from the solution D. Each of these layers 2*e* and 2*f* had a thickness of 2 μm.

The four-branch optical waveguide was fabricated by following the same procedure as in Example 6 described above except for the above-mentioned procedure.

The insertion losses were measured, and as a result of this, these were not affected by the thickness of the substrates.

The branch-to-branch variations of the insertion losses was constant at 0.2 dB.

EXAMPLE 9

Figure 20:
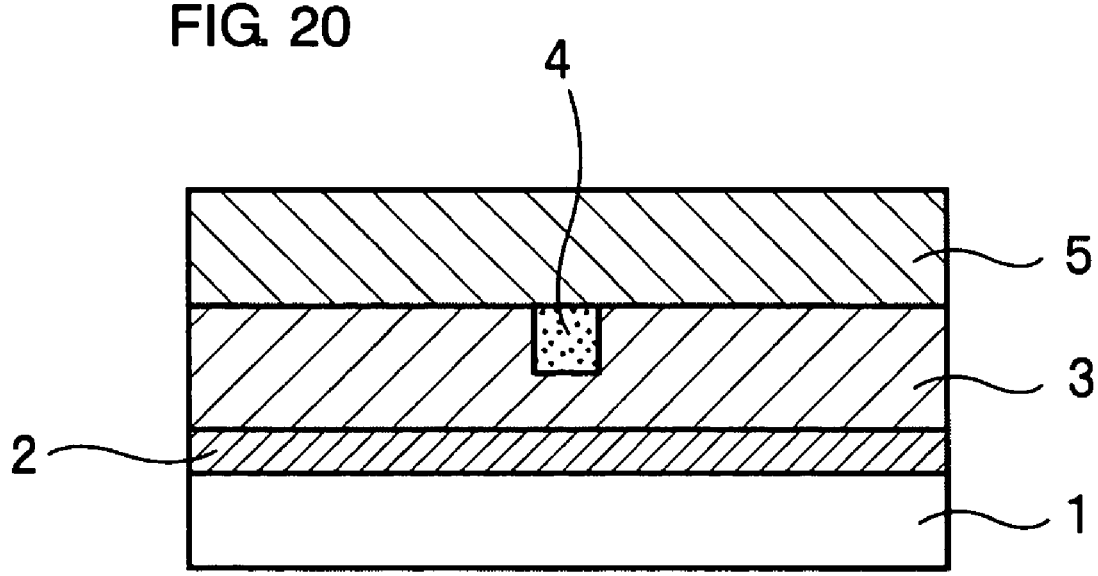
FIG. 20 is a sectional view showing an optical waveguide of a further embodiment according to the present invention.

A four-branch optical waveguide of an embodiment shown in FIG. 20 was fabricated. The optical waveguide was fabricated by following the same procedure as in Examples described above except for forming the ultraviolet control region 2 from the solution C. The thickness of the ultraviolet control region 2 was 2 μm.

The branch-to-branch variations of the insertion losses of the four-branch optical waveguides fabricated were measured to obtain a constant value of 0.2 dB and there was no effect of the thickness of the substrates.

EXAMPLE 10

Figure 21:
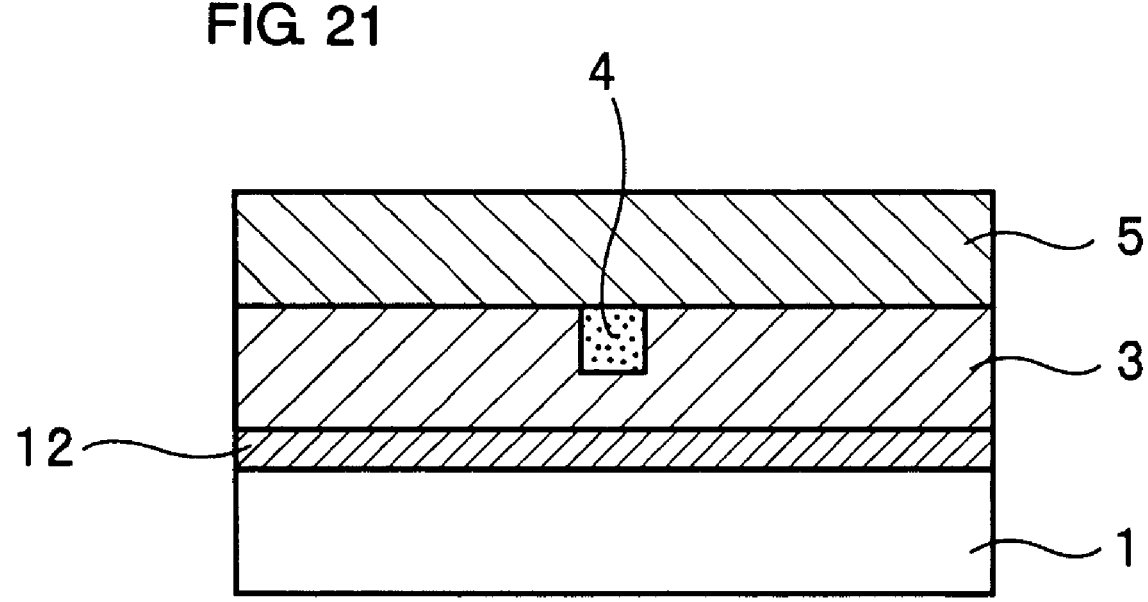
FIG. 21 is a sectional view showing an optical waveguide of a further embodiment according to the present invention.

A four-branch optical waveguide of an embodiment shown in FIG. 21 was fabricated.

The optical waveguide was fabricated by following the same procedure as in Example 6 described above except for forming the ultraviolet control region 2 from an aluminum vapor deposition film of 1 μm in thickness.

The branch-to-branch variations of the insertion losses of the four-branch optical waveguides fabricated were measured to obtain a constant value of 0.2 dB without affected by the thickness of the substrates.

EXAMPLE 11

A lower clad layer, a core layer, an upper clad layer and an ultraviolet control region were formed by using a commercially available ultra violet curable epoxy resin to fabricate a four-branch optical waveguide having a structure similar to Example 1.

As the solution A for forming a clad layer, there was used a commercially available ultra violet curable epoxy resin, a cured substance of which has a refractive index of 1.494. As the solution B for forming a core layer, there was used a commercially available ultraviolet curable epoxy resin, a cured substance of which has a refractive index of 1.498. As the solution C for forming an ultraviolet control region, there was used a commercially available ultra violet curable epoxy resin, a cured substance of which has a refractive index of 1.520.

The four-branch optical waveguide was fabricated by following the same procedure as in Example 1 except that the above-mentioned solutions were used as the solutions A, B and C and a time period of irradiating ultraviolet light was changed to 10 minutes.

The fabricated four-branch optical waveguide was observed with an optical microscope, and as a result of this, the surface roughness Rz per a length of 250 μm of recesses and projections on the surface of the substrate and on an interface of the lower clad layer and the ultraviolet control region were 100 nm.

And, the branch-to-branch variations of the insertion losses were measured in the same way as in Example 1 to obtain a value of 0.2 dB in all cases irrespective of the thickness of the substrates.

It was found from the above results that the same effects as in Example 1 could also be attained when the optical waveguide is fabricated using UV curable epoxy resin.

EXAMPLE 12

In this embodiment, a lower clad layer, a core layer, an upper clad layer and an ultraviolet control region were formed from an ultra violet curable acrylic resin.

As the solution A for forming a clad layer, there was used a commercially available ultra violet curable acrylic resin, a cured substance of which has a refractive index of 1.494. As the solution B for forming a core layer, there was used a commercially available ultra violet curable acrylic resin, a cured substance of which has a refractive index of 1.498. As the solution C for forming an ultraviolet control region, there was used a commercially available ultra violet curable acrylic resin, a cured substance of which has a refractive index of 1.520.

A four-branch optical waveguide was fabricated by following the same procedure as in Example 11 except that the above-mentioned solutions were used as the solutions A, B and C.

The fabricated four-branch optical waveguide was observed with an optical microscope, and as a result of this, the surface roughness Rz per a length of 250 μm of recesses and projections on the surface of the substrate and on an interface of the lower clad layer and the ultraviolet control region were 100 nm.

And, the branch-to-branch variations of the insertion losses of the four-branch optical waveguide fabricated were measured in the same way as in Example 1 to obtain a value of 0.2 dB in all cases irrespective of the thickness of the substrates.

It was found from the above results that the same effects as in Example 1 could also be attained when the four-branch optical waveguide is fabricated using UV curable acrylic resin.

EXAMPLE 12-1

In this example, 4.5 ml of phenyltrimethoxysilane of Example 1 was changed to diphenyldimethoxysilane.

With respect to a solution for forming a clad layer, 4.5 ml of phenyltrimethoxysilane was changed to 3.7 ml of diphenyldimethoxysilane. The refractive index was 1.543.

With respect to a solution for forming a core layer, 7.0 ml of phenyltrimethoxysilane was changed to 4.64 ml of diphenyldimethoxysilane. The refractive index was 1.547. Another steps were similar to that under [Fabrication of four-branch optical waveguide] in Example 1.

As a result of this, the results similar to that under Measurement of insertion loss in Example 1 could be obtained.

Measurement of Glass Transition Point

A glass transition point of each sample was measured using the lower clad layers fabricated in Example 1 and Example 12-1 as a sample.

The glass transition point was evaluated using a dynamic viscoelasticity measuring apparatus. As a result of this, the lower clad layers of Example 1 were found to have a high glass transition point of 300° C. or higher. Also, the lower clad layers of Example 12-1 were found to have a high glass transition point of 250° C. or higher.

Accordingly, it is possible to laminate a metal layer or a dielectric material having good film characteristics and high adhesion by using this material and conducting substrate heating in a vacuum deposition process or sputtering, and to form an antireflection coating by this lamination. Since it has the heat resistance for a temperature higher than a melting point of solder, this material can constitute an electric circuit and the optical waveguide of the present invention can also be combined with an electric circuit.

EXAMPLE 13

Figure 22:
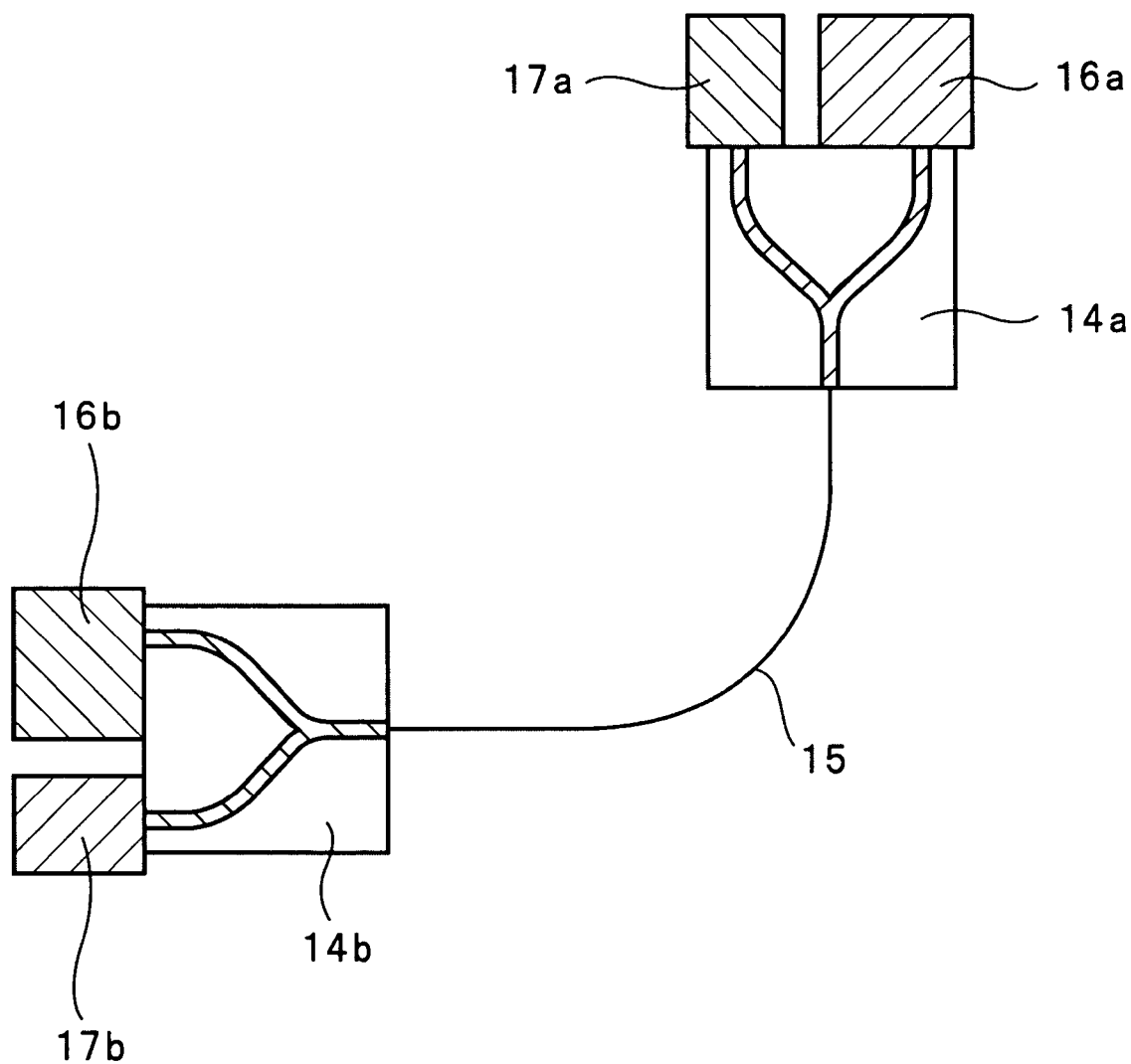
FIG. 22 is a schematic view showing an example of an optical transmitter and receiver module using the optical waveguide of the present invention.

Two-branch optical waveguides 14a and 14b shown in FIG. 22 were fabricated by following the same procedure as in Example 1. Using these as an optical transmitter and receiver module 14a and 14b, a laser diode 16a and a photo diode 17a were connected to the optical transmitter and receiver module 14a, and also a laser diode 16b and a photo diode 17b were connected to the optical transmitter and receiver module 14b, and an optical fiber 15 was connected between the optical transmitter and receiver modules 14a and 14b, as shown in FIG. 22. As a pulse of light of 100 kHz was input from the laser diode 16a of the optical transmitter and receiver modules 14a, the pulse of light could be reproduced from the photo diode 17b of the optical transmitter and receiver modules 14b. And, signals from the laser diode 16b could be received at the photo diode 17a. Therefore, it was verified that the optical waveguide of the present invention functions as an optical transmitter and receiver module.

EXAMPLE 14

Figure 23:
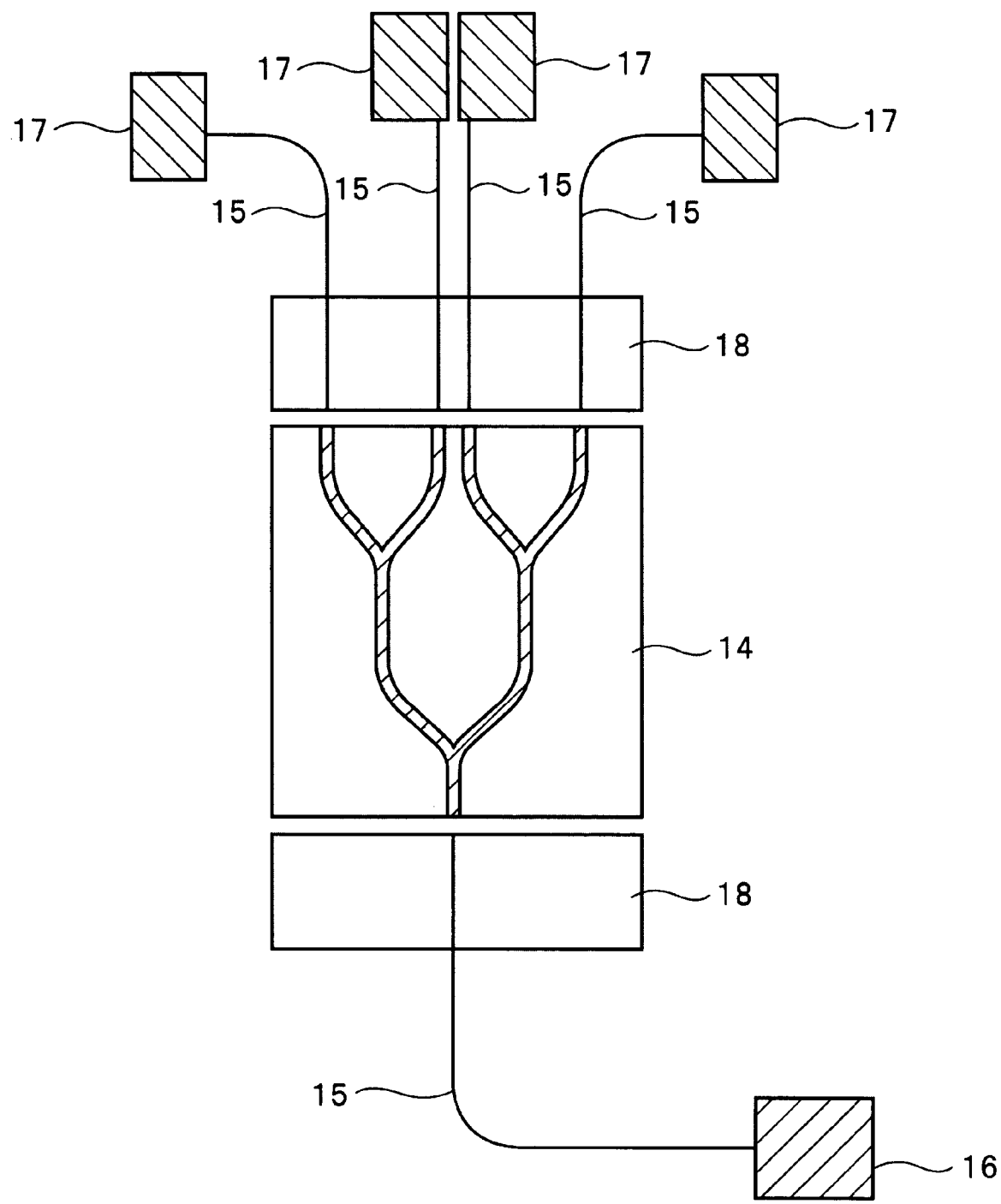
FIG. 23 is a schematic view showing an example of an optical coupler module using the optical waveguide of the present invention.

As shown in FIG. 23, a photo coupler module was fabricated using the four-branch optical waveguide 14 fabricated in Example 1 as a medium. Specifically, an optical fiber 15 was connected between a laser diode 16 and an optical fiber array 18 and this optical fiber array 18 was connected to an input side of the four-branch optical waveguide. Further, other optical fiber array 18 was connected to an output side of the four-branch optical waveguide, and four photo diodes 17 were connected to four output terminals of the optical fiber array 18, respectively, through optical fibers 15.

As light with a wavelength of 1,300 nm was input from the laser diode 16, it could be received at four photo diodes 17, respectively. Therefore, the light input could be branched into four.

The optical waveguide of the present invention can be widely applied for elements which use an ultra violet curable resin and require highly accurate control of a refractive index. It can be used, for example, in optical elements related to display devices (a display, a liquid crystal projector or etc.) such as an integrator lens, a microlens array, a reflecting plate, a light guide plate and a screen for projection; and others such as an eyeglasses, an optical system for CCD, an optical lens, an optical filter, a diffraction grating, an interferometer, an optical sensor, a holographic optical element, an other optical parts, and a contact lens.

What is claimed is:

1. An optical waveguide comprising:
   a core layer to be an optical waveguide region;
   upper clad and lower clad layers covering the core layer;
   a substrate and/or an upper substrate; and
   an ultraviolet control region for preventing ultraviolet light from entering, wherein
   said lower clad layer being disposed between said substrate and said core layer, and/or, said upper clad layer being disposed between said upper substrate and said core layer,
   said ultraviolet control region is formed from a metal alkoxide having a polymerizable group which is polymerized by light or heat and a metal alkoxide not having the polymerizable group,
   said ultraviolet control region being disposed at any one location between said lower clad layer and said substrate, between said lower clad layer and said upper clad layer, or between said upper clad layer and said upper substrate, and
   recesses and projections are formed on the surface of at least one side of said ultraviolet control region.

2. The optical waveguide according to claim 1, characterized in that at least one of a component for light absorption and a component for light scattering is contained in said ultraviolet control region.

3. The optical waveguide according to claim 1, characterized in that said ultraviolet control region is formed by stacking two or more kinds of thin films having different refractive indexes.

4. The optical waveguide according to claim 1, characterized in that said ultraviolet control region is formed from a thin film which is different in a refractive index from a layer adjacent to the ultraviolet control region.

5. The optical waveguide according to claim 1, characterized in that at least one layer of said core layer, said upper clad layer and said lower clad layer is formed from an organic-inorganic composite material.

6. The optical waveguide according to claim 1, characterized in that an optical waveguide is formed on a substrate.

7. A device for optical communication, characterized in that the optical waveguide according to claim 1 is used as a medium for sending and/or receiving optical signals.

8. A device for optical communication, characterized in that the optical waveguide according to claim 1 is used as a medium for branching or coupling optical signals.

* * * * *